US008055358B2

(12) United States Patent
Blevins et al.

(10) Patent No.: US 8,055,358 B2
(45) Date of Patent: Nov. 8, 2011

(54) MULTI-OBJECTIVE PREDICTIVE PROCESS OPTIMIZATION WITH CONCURRENT PROCESS SIMULATION

(75) Inventors: Terrence L. Blevins, Round Rock, TX (US); Wilhelm K. Wojsznis, Austin, TX (US); Mark J. Nixon, Round Rock, TX (US); Peter Wojsznis, Cedar Park, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 215 days.

(21) Appl. No.: 11/567,107

(22) Filed: Dec. 5, 2006

(65) Prior Publication Data

US 2007/0168057 A1    Jul. 19, 2007

Related U.S. Application Data

(60) Provisional application No. 60/742,322, filed on Dec. 5, 2005.

(51) Int. Cl.
*G05B 13/02* (2006.01)
(52) U.S. Cl. ................................. 700/28; 700/44; 700/45
(58) Field of Classification Search .................... 700/28, 700/44–45; 703/6, 13
See application file for complete search history.

(56) References Cited

U.S. PATENT DOCUMENTS

| | | | |
|---|---|---|---|
| 30,280 A | 10/1860 | Watson | |
| 4,316,952 A | 2/1982 | Wendling | |
| 4,349,869 A | 9/1982 | Prett et al. | |
| 4,358,822 A | 11/1982 | Sanchez et al. | |
| 4,506,324 A | 3/1985 | Healy | |
| 4,512,747 A | 4/1985 | Hitchens et al. | |
| 4,546,649 A | 10/1985 | Kantor | |
| 4,613,952 A | 9/1986 | McClanahan | |
| 4,616,308 A | 10/1986 | Morshedi et al. | |
| 4,628,435 A | 12/1986 | Tashiro et al. | |
| 4,663,704 A | 5/1987 | Jones et al. | |
| 4,736,320 A | 4/1988 | Bristol | |
| 4,885,717 A | 12/1989 | Beck et al. | |
| 4,972,328 A | 11/1990 | Wu et al. | |
| 4,977,529 A | 12/1990 | Gregg et al. | |
| 5,014,208 A | 5/1991 | Wolfson | |

(Continued)

FOREIGN PATENT DOCUMENTS

EP    0 813 129 A2    12/1997

(Continued)

OTHER PUBLICATIONS

Qin et al., "An Overview of Industrial Model Predictive Control Technology," *AIChE Conference* (1996).

(Continued)

*Primary Examiner* — Ronald D Hartman, Jr.
(74) *Attorney, Agent, or Firm* — Marshall, Gerstein & Borun LLP

(57) ABSTRACT

A system and method for controlling a process includes simulating the process and producing a simulated output of the process, developing a set of target values based on measured inputs from the process and based on the simulated output from the process simulator, and producing multiple control outputs configured to control the process based on the set of target values during each operational cycle of the process control system. The simulated outputs include one or more predicted future values up to the steady state of the process.

52 Claims, 10 Drawing Sheets

U.S. PATENT DOCUMENTS

| | | |
|---|---|---|
| 5,021,947 A | 6/1991 | Campbell et al. |
| 5,041,964 A | 8/1991 | Cole et al. |
| 5,051,898 A | 9/1991 | Wright et al. |
| 5,079,731 A | 1/1992 | Miller et al. |
| 5,092,449 A | 3/1992 | Bolin et al. |
| 5,097,412 A | 3/1992 | Orimo et al. |
| 5,119,468 A | 6/1992 | Owens |
| 5,159,685 A | 10/1992 | Kung |
| 5,168,441 A | 12/1992 | Onarheim et al. |
| 5,218,709 A | 6/1993 | Fijany et al. |
| 5,241,296 A | 8/1993 | Naka et al. |
| 5,268,834 A | 12/1993 | Sanner et al. |
| 5,321,829 A | 6/1994 | Zifferer |
| 5,347,446 A | 9/1994 | Iino et al. |
| 5,347,466 A | 9/1994 | Nichols et al. |
| 5,361,198 A | 11/1994 | Harmon et al. |
| 5,428,555 A | 6/1995 | Starkey et al. |
| 5,485,600 A | 1/1996 | Joseph et al. |
| 5,485,620 A | 1/1996 | Sadre et al. |
| 5,509,116 A | 4/1996 | Hiraga et al. |
| 5,530,643 A | 6/1996 | Hodorowski |
| 5,546,301 A | 8/1996 | Agrawal et al. |
| 5,555,385 A | 9/1996 | Osisek |
| 5,576,946 A | 11/1996 | Bender et al. |
| 5,594,858 A | 1/1997 | Blevins |
| 5,603,018 A | 2/1997 | Terada et al. |
| 5,611,059 A | 3/1997 | Benton et al. |
| 5,631,825 A | 5/1997 | van Weele et al. |
| 5,732,192 A | 3/1998 | Malin et al. |
| 5,752,008 A | 5/1998 | Bowling |
| 5,768,119 A | 6/1998 | Havekost et al. |
| 5,796,602 A | 8/1998 | Wellan et al. |
| 5,801,942 A | 9/1998 | Nixon et al. |
| 5,806,053 A | 9/1998 | Tresp et al. |
| 5,812,394 A | 9/1998 | Lewis et al. |
| 5,818,736 A | 10/1998 | Leibold |
| 5,821,934 A | 10/1998 | Kodosky et al. |
| 5,826,060 A | 10/1998 | Santoline et al. |
| 5,828,851 A | 10/1998 | Nicon et al. |
| 5,838,563 A | 11/1998 | Dove et al. |
| 5,862,052 A | 1/1999 | Nixon et al. |
| 5,889,530 A | 3/1999 | Findlay |
| 5,892,939 A | 4/1999 | Call et al. |
| 5,898,860 A | 4/1999 | Leibold |
| 5,903,455 A | 5/1999 | Sharpe, Jr. et al. |
| 5,909,916 A | 6/1999 | Foster et al. |
| 5,933,345 A | 8/1999 | Martin et al. |
| 5,940,294 A | 8/1999 | Dove |
| 5,950,006 A | 9/1999 | Crater et al. |
| 5,960,214 A | 9/1999 | Sharpe, Jr. et al. |
| 5,970,430 A | 10/1999 | Burns et al. |
| 5,980,078 A | 11/1999 | Krivoshein et al. |
| 5,983,016 A | 11/1999 | Brodsky et al. |
| 5,995,753 A | 11/1999 | Walker |
| 5,995,916 A | 11/1999 | Nixon et al. |
| 6,003,037 A | 12/1999 | Kassabgi et al. |
| 6,023,644 A | 2/2000 | Kinsman |
| 6,032,208 A | 2/2000 | Nixon et al. |
| 6,041,171 A | 3/2000 | Blaisdell et al. |
| 6,069,629 A | 5/2000 | Paterson et al. |
| 6,078,320 A | 6/2000 | Dove et al. |
| 6,094,600 A | 7/2000 | Sharpe, Jr. et al. |
| 6,098,116 A | 8/2000 | Nixon et al. |
| 6,138,174 A | 10/2000 | Keeley |
| 6,146,143 A | 11/2000 | Huston et al. |
| 6,157,864 A | 12/2000 | Schwenke et al. |
| 6,161,051 A | 12/2000 | Hafemann et al. |
| 6,167,316 A | 12/2000 | Gloudeman et al. |
| 6,178,393 B1 | 1/2001 | Irvin |
| 6,195,591 B1 | 2/2001 | Nixon et al. |
| 6,201,996 B1 | 3/2001 | Crater et al. |
| 6,289,508 B1 | 9/2001 | Erickson et al. |
| 6,298,454 B1 | 10/2001 | Schleiss et al. |
| 6,366,272 B1 | 4/2002 | Rosenberg et al. |
| 6,385,496 B1 | 5/2002 | Irwin et al. |
| 6,415,418 B1 | 7/2002 | McLaughlin et al. |
| 6,442,512 B1 | 8/2002 | Sengupta et al. |
| 6,442,515 B1 | 8/2002 | Varma et al. |
| 6,445,963 B1 | 9/2002 | Blevins et al. |
| 6,449,624 B1 | 9/2002 | Hammack et al. |
| 6,466,893 B1 * | 10/2002 | Latwesen et al. ............. 702/179 |
| 6,477,435 B1 | 11/2002 | Ryan et al. |
| 6,505,519 B2 | 1/2003 | Henry et al. |
| 6,510,351 B1 | 1/2003 | Blevins et al. |
| 6,515,683 B1 | 2/2003 | Wright |
| 6,522,934 B1 | 2/2003 | Irwin et al. |
| 6,546,297 B1 | 4/2003 | Gaston et al. |
| 6,577,908 B1 | 6/2003 | Wojsznis et al. |
| 6,587,108 B1 | 7/2003 | Guerlain et al. |
| 6,615,090 B1 * | 9/2003 | Blevins et al. ................. 700/26 |
| 6,618,630 B1 | 9/2003 | Jundt et al. |
| 6,618,745 B2 | 9/2003 | Christensen et al. |
| 6,633,782 B1 | 10/2003 | Schleiss et al. |
| 6,647,315 B1 | 11/2003 | Sherriff et al. |
| 6,684,385 B1 | 1/2004 | Bailey et al. |
| 6,687,698 B1 | 2/2004 | Nixon et al. |
| 6,704,737 B1 | 3/2004 | Nixon et al. |
| 6,711,629 B1 | 3/2004 | Christensen et al. |
| 6,754,885 B1 | 6/2004 | Dardinski et al. |
| 6,758,102 B2 | 7/2004 | Henry et al. |
| 6,795,798 B2 | 9/2004 | Eryurek et al. |
| 6,804,636 B2 | 10/2004 | Senta et al. |
| 6,816,822 B1 * | 11/2004 | Hess et al. ........................ 703/2 |
| 6,981,424 B2 | 1/2006 | Henry et al. |
| 7,050,083 B2 | 5/2006 | Yoo et al. |
| 7,050,863 B2 | 5/2006 | Mehta et al. |
| 7,065,476 B2 | 6/2006 | Dessureault et al. |
| 7,089,530 B1 | 8/2006 | Dardinski et al. |
| 7,096,465 B1 | 8/2006 | Dardinski et al. |
| 7,110,835 B2 | 9/2006 | Blevins et al. |
| 7,113,834 B2 | 9/2006 | Wojsznis et al. |
| 7,113,835 B2 | 9/2006 | Boyden et al. |
| 7,146,231 B2 | 12/2006 | Schleiss et al. |
| 7,219,306 B2 | 5/2007 | Kodosky et al. |
| 7,317,953 B2 | 1/2008 | Wojsznis et al. |
| 7,317,959 B2 | 1/2008 | Pfander et al. |
| 7,415,312 B2 | 8/2008 | Barnett, Jr. et al. |
| 7,502,656 B2 | 3/2009 | Thibault et al. |
| 7,555,471 B2 | 6/2009 | Hogue et al. |
| 7,593,780 B2 | 9/2009 | Mann et al. |
| 7,647,126 B2 | 1/2010 | Blevins et al. |
| 7,680,637 B1 * | 3/2010 | Wolodkin ........................ 703/6 |
| 2002/0010571 A1 | 1/2002 | Daniel et al. |
| 2002/0111783 A1 | 8/2002 | Kodosky et al. |
| 2002/0161940 A1 | 10/2002 | Eryurek et al. |
| 2003/0188830 A1 | 10/2003 | Narendrnath et al. |
| 2003/0200062 A1 | 10/2003 | Dessureault et al. |
| 2004/0032433 A1 | 2/2004 | Kodosky et al. |
| 2004/0049295 A1 * | 3/2004 | Wojsznis et al. ................ 700/28 |
| 2004/0049299 A1 | 3/2004 | Wojsznis et al. |
| 2004/0078182 A1 | 4/2004 | Nixon et al. |
| 2004/0117766 A1 | 6/2004 | Mehta et al. |
| 2004/0249483 A1 | 12/2004 | Wojsznis et al. |
| 2005/0062677 A1 | 3/2005 | Nixon et al. |
| 2005/0096872 A1 | 5/2005 | Blevins et al. |
| 2005/0158701 A1 | 7/2005 | West |
| 2005/0164684 A1 | 7/2005 | Chen et al. |
| 2005/0187717 A1 | 8/2005 | Paxson et al. |
| 2005/0197786 A1 | 9/2005 | Kataria et al. |
| 2005/0240364 A1 * | 10/2005 | Friman ........................... 702/66 |
| 2006/0073013 A1 | 4/2006 | Emigholz et al. |
| 2007/0078529 A1 | 4/2007 | Thiele et al. |
| 2007/0129917 A1 | 6/2007 | Blevins et al. |
| 2007/0156264 A1 | 7/2007 | Schleiss et al. |
| 2008/0288089 A1 | 11/2008 | Pettus et al. |
| 2009/0210814 A1 | 8/2009 | Agrusa et al. |
| 2009/0222752 A1 | 9/2009 | Wall et al. |
| 2009/0287321 A1 | 11/2009 | Lucas et al. |

FOREIGN PATENT DOCUMENTS

| | | |
|---|---|---|
| EP | 1 204 033 | 5/2002 |
| EP | 1 284 446 | 2/2003 |
| GB | 2 328 523 | 2/1999 |
| GB | 2 335 545 | 4/2000 |
| GB | 2 348 020 | 9/2000 |
| GB | 2 371 884 | 8/2002 |
| GB | 2 394 312 A | 4/2004 |

| | | |
|---|---|---|
| GB | 2 402 499 | 12/2004 |
| GB | 2 446 343 A | 8/2008 |
| JP | 1-298389 | 12/1979 |
| JP | 60-75909 A | 4/1985 |
| JP | 1-120593 | 5/1989 |
| JP | 2-310602 | 12/1990 |
| JP | 3-257509 | 11/1991 |
| JP | 5-54277 | 3/1993 |
| JP | 6-26093 | 2/1994 |
| JP | 7-036538 | 2/1995 |
| JP | 7-248941 | 9/1995 |
| JP | 8-314760 | 11/1996 |
| JP | 9-134213 A | 5/1997 |
| JP | 9-330013 | 12/1997 |
| JP | 11-007315 A | 1/1999 |
| JP | 2000-050531 | 2/2000 |
| JP | 2000-311004 | 11/2000 |
| JP | 2000-346299 A | 12/2000 |
| JP | 2002-140114 | 5/2002 |
| JP | 2002-215221 A | 7/2002 |
| JP | 2002-258936 | 9/2002 |
| JP | 2002-303564 | 10/2002 |
| JP | 2003-34629 A | 9/2004 |
| JP | 9-288512 | 11/2007 |
| WO | WO-97/38362 | 10/1997 |
| WO | WO-97/45778 | 12/1997 |
| WO | WO-2007/067645 | 6/2007 |

OTHER PUBLICATIONS

International Preliminary Report on Patentability for International Application No. PCT/US2006/046590, dated Jun. 11, 2008.
International Search Report and Written Opinion for International Application No. PCT/US2006/046590, dated Jul. 6, 2007.
European Office Action for corresponding EPO Application No. 06839108.5-2206, dated Apr. 2, 2009.
Chinese Office Action Application No. 200680045695.9 dated Nov. 6, 2009.
Edgar, T., Himmelblau. D., Landon, L. "Optimization of chemical processes," McGraw-Hill, 2001.
Qin, S. J. And Badgwell. T. A. "An Overview of Industrial Model Predictive Control Technology," *Fifth International Conference on Chemical Process control*, pp. 232- 256, AIChE and Cache, 1997.
Matthias Ehrgott, Xavier Gandibleux, "Multiple criteria optimization," *Kluwe's International Series* 2002.
Tyler. M.L.; and Morani M., "Propositional Logic in Control and Monitoring Problems." In *Proceedings of European Control Conference* '97, pp. 623-628, Bruxelles, Belgium, Jun. 1997.
Vada, J., Slupphaug, 0. and Foss, B.A., "Infeasibility Handling in Linear MPC subject to Prioritized Constraints, " In *PreprintsIFAC* '99 14th *World Congress*, Beijing, China, Jul. 1999.
Vada, J., Slupphaug, 0. and Johansen, T.A.. "Efficient Infeasibility Handling in Linear MPC Subject to Prioritized Constraints," in ACC2002 *Proceedings*, Anchorage, Alaska, May 2002.
Wojsznis, W., T., Thiele D., VVojsznis, P., and Mehta, A., "Integration of Real Time Process Optimizer with a Model Predictive Function Block," *ISA Conference*, Chicago, Oct. 2002.
Wojsznis, W., Terry Blevins. Mark Nixon, Peter Wojsznis, "Infeasibility Handing in MPC with Prioritized Constraints," *ISA Conference*, Houston, Oct. 2003.
Mehta, A.. Wojsznis, W., Thiele, D., and Blevins. T., "Constraints Handling in Multivariable System by Managing MPC Squared Controller," *ISA Conference*, Houston, Oct. 2003.
Wojsznis, W.. Blevins, T., Wojsznis, P.. Mehta, A., "Extending LP Optimizer Functionality for Model Predictive Control," *CDC/ECC* 06, Seville, Spain, Dec. 2006.
http://easydeltav.com/keytechnologies/index.asp, @ 1996-2006.
William H. Press, Saul A. Teukolsky, William T. Vetterling, Brian P. Flannery, "Numerical Recipes in C," *Cambridge University Press*, 1997.
Maciejowski J.M,. "Predictive Control with Constraints," *Prentice Hall*, 2002.
Boudreau. M., "Squared Model Predictive Controller Performance on the Shell Standard Control Problem." *ISA Conference*, Houston, Oct. 2003.

A. Nunez-Reyes, C.B. Scheffer-Dutra, C. Bordons, "Comparison to different predictive controllers with multi-objective optimization. Application to an olive mill," *Congress of Control Applications*, pp. 1242-1247, Glasgow, 2002.
Patents Act 1977 Examination Report under Section 18(3) dated Jun. 29, 2010.
"Powerful Solutions for Digital Plants", Mimic Simulation v2.6, Mynah Technologies, Mar. 2003, pp. 1-15.
Alsop et al., "What Dynamic Simulation Brings to a Process Control Engineer: Applied Case Study to a Propylene/Propane Splitter," (available prior to Dec. 5, 2005). URL:http://www.aspentech.corn/publication_files/ertc2004_alsop_ferrer.pdf.
Bailey, "Elsag Bailey Automation", approximately 1993.
Bailey, "Introducing Bailey Evolution 90™ . . . The Sound Investment Strategy for Process Automation", 1993.
Bailey, "Wide-Range, Fully Compatible Family of Process Automation and Management Systems", 1993.
Chinese Office Action for Application No. 2003101027291, dated Jun. 21, 2007.
Chinese Office Action for Application No. 2003101027291, dated Nov. 19, 2010.
Chinese Rejection Decision for Application No. 2003101027291, dated Feb. 5, 2010.
Combined Search and Examination Report for Application No. GB 0514158.5, dated Dec. 23, 2005.
Combined Search and Examination Report for Application No. GB 0514161.9, dated Jan. 10, 2006.
Combined Search and Examination Report for Application No. GB 0514164.3, dated Dec. 23, 2005.
Combined Search and Examination Report for Application No. GB 0514167.6, dated Jan. 5, 2006.
Computer Products, "Unbundling the DCS", approximately 1992.
Examination Report for Application No. GB0324470.4, dated Sep. 30, 2004.
Examination Report for Application No. GB0324633.7, dated Sep. 13, 2005.
Examination Report for Application No. GB0719214.9, dated Mar. 4, 2010.
Examination Report for Application No. GB0719214.9, dated Aug. 10, 2010.
Examination Report for Application No. GB0719214.9, dated Sep. 9, 2009.
Examination Report for Application No. GB0810145.3, dated Jun. 29, 2010.
Fisher-Rosemount, "Managing the Process Better", Dec. 1993.
Fisher-Rosemount, "Managing the Process Better", Sep. 1993.
Honeywell, "Process Manager Specification and Technical Data", Sep. 1991.
Honeywell, "TDC 3000 Overview", approximately 1992.
Honeywell, "TDC 3000 Process Manager", approximately 1992.
Honeywell, "UDC 6000 Process Controller", Aug. 1992.
Invensys Process Systems News, Invensys Introduces Enhanced Foxboro Engineering and Operations for the I/A Series Automation System, (Apr. 2002): Retrieved from the Internet on May 28, 2010: URL:http://www.automation.com/smc/print.php?stripImages=no.
Jones, James D., "Real-Time Process Optimization—What's Needed Next," *Process Modeling and Control Consortium Meeting*, Texas Tech University (Apr. 3, 2002).
Leeds et al., "Make Your Automation Plan a Reality: MAX 1000", approximately 1990.
Marler et al., "Survey of Multi-Objective Optimization Methods for Engineering," *Struct. Multidisc Optim*., 26:369-395 (Mar. 23, 2004).
Nahavandi et al., "A Virtual Manufacturing Environment with an Element of Reality," *Advanced Factory Automation, Conf.* Pub. 398: 624-629 (Oct. 3-5, 1994).
Notice of Rejection for Japanese Application No. 2000-134873, dated Feb. 3, 2004.
Notice of Rejection for Japanese Application No. 2003-358631, dated Jan. 12, 2007.
Notice of Rejection for Japanese Application No. 2003-358631, dated Sep. 4, 2007.
Notice of Rejection for Japanese Application No. 2003-362187, dated Nov. 2, 2009.

Notice of Rejection for Japanese Application No. 2003-362187, dated Sep. 6, 2010.
Office Action for U.S. Appl. No. 11/537,975, dated Jul. 8, 2009.
Ohmura, "Dynamic Simulator Visual Modeler," pp. 20-27 (1998).
Podesta et al., "Virtual Instrumentation for the Management, Simulation and Control of an in House Power Plant," IEEE Instrumentation and Measurement Technology Conference, pp. 1104-1106 (Jun. 4-6, 1996).
PSS 21S-2B8 B4, FoxView Software, pp. 1-12 (1996-2005).
Reliance Electric Company, "Multitasking Capability Simplifies Process Control Design", approximately late 1980s, by Angelo J. Notte.
Search Report for Application No. GB0719214.9, dated Feb. 12, 2008.
Search Report for Application No. GB 0010850.6, dated Sep. 5, 2000.
Search Report for Application No. GB 0324470.4, dated Mar. 25, 2004.
Search Report for Application No. GB 0324633.7, dated Mar. 30, 2004.
Toshiba, "Toshiba Integrated Control Systems", Nov. 1990.
UPID Brochure, Cutler Technology Corporation, URL:http://www.culter-tech.com (available prior to Dec. 5, 2005).
Roger G. Franks, "Modeling and Simulation in Chemical Engineering", Wiley-Interscience, John Wiley & Sons, 1972, 411 pages.
Chinese Office Action in Application No. 200680045695.9 dated Jul. 6, 2011.

* cited by examiner

MULTI-OBJECTIVE PREDICTIVE PROCESS OPTIMIZATION WITH CONCURRENT PROCESS SIMULATION

CROSS-REFERENCE TO RELATED APPLICATIONS

This patent claims priority from U.S. Provisional Application Ser. No. 60/742,322 which was filed on Dec. 5, 2005, the contents of which are expressly incorporated by reference herein in its entirety for all purposes.

FIELD OF THE TECHNOLOGY

The present disclosure relates generally to process control systems within process plants and, more particularly, to optimization of a process using process simulation and predictive modeling.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

Process controllers are typically programmed to execute different algorithms, sub routines or control loops (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single output control block, such as a proportional integral derivative (PID) or a fuzzy logic control function block, and a single output block, such as an analog output (AO) function block. These control loops typically perform single input/single output control because the control block creates a single control output used to control a single process input, such as a valve position, etc. However, in certain cases, the use of a number of independently operating, single input/single output control loops is not very effective because the process variables being controlled are affected by more than a single process input and, in fact, each process input may affect the state of many process outputs. For example, single input/single output control loops cause the process outputs to behave in an unacceptable manner wherein the outputs oscillate without ever reaching a steady state condition.

Optimization of the industrial processes has been used to determine the most optimal solution to a particular problem, taking into account maximization of plant revenues, limit emissions, minimize production costs, etc. while meeting customer demands for different products and staying within the limits of resources and equipment. Optimizers have been developed since 1960s. However, problems involved in optimization include selecting one or more optimization variables, choosing an objective function and identifying the set of constraints, such as the examples provided above. Accordingly, the constraints for the problem limit the solution.

Real-Time Optimizers (RTOs) have been used to optimize process functions. Generally, RTO utilizes linear and nonlinear high fidelity models which generally requires substantial development and maintenance efforts. However, difficulties associated with implementing RTO result in few successful installations, much less than successful installations associated with model predictive control (MPC) implementations.

Model predictive control (MPC) or other types of advanced control have been used to perform process control in situations in which changes to a particular controlled process variable affects more than one process variable or output. Since the late 1970s, many successful implementations of model predictive control have been reported and MPC has become the primary form of advanced multivariable control in the process industry. Still further, MPC control has been implemented within distributed control systems as distributed control system layered software. U.S. Pat. Nos. 4,616, 308 and 4,349,869 generally describe MPC controllers that can be used within a process control system. A typical MPC applies an optimizer for economic optimization and constraints handling.

Generally speaking, MPC is a multiple input/multiple output control strategy in which the effects of changing each of a number of process inputs on each of a number of process outputs is measured and these measured responses are then used to create a control matrix or a model of the process. The process model or control matrix (which generally defines the dynamic operation of the process) is inverted mathematically and is then used in or as a multiple input/multiple output controller to control the process outputs based on changes made to the process inputs. In some cases, the process model is represented as a process output response curve (typically a step response curve) for each of the process inputs and these curves may be created based on a series of, for example, pseudo random step changes delivered to each of the process inputs. These response curves can be used to model the process in known manners. Model predictive control is known in the art and, as a result, the specifics thereof will not be described herein. However, MPC is described generally in Qin, S. Joe and Thomas A. Badgwell, "An Overview of Industrial Model Predictive Control Technology," AIChE Conference, 1996.

MPC has been found to be a very effective and useful control technique and has used in conjunction with process optimization. To optimize a process which uses MPC, an optimizer minimizes or maximizes one or more process input variables determined by the MPC routine so as to cause the process to run at an optimal point. While this technique is computationally possible, it is necessary to select the process variables that have, for example, a significant impact on improving the economic operation of the process (e.g. process throughput or quality) to optimize the process from an economic standpoint. Operating the process at an optimal point from a financial or economic viewpoint typically requires controlling many process variables in conjunction with one another, not just a single process variable. The successful implementation of optimizer with MPC can be contributed to such factors as ease of implementing process modeling applied with MPC, integration with the configuration system, MPC feedback used for modeling correction, and utilization of the model prediction of the process steady state in the optimization model. Of these four factors, integration with the configuration system is a significant factor. The configuration system specifies what equipment is available, how the equipment is configured and specifies constraints associated with the equipment.

In most cases when using MPC, the number of manipulated variables available within the process (i.e., the control outputs of the MPC routine) is greater than the number of control variables of the process (i.e., the number of process variables that must be controlled to be at a particular set point). As a result, there are usually more degrees of freedom that are available for optimization and constraint handling. Theoretically, to perform such optimization, values expressed by process variables, constraints, limits and economic factors defining an optimal operation point of the process should be calculated. In many cases, these process variables are constrained variables because they have limits related to physical properties of the process to which they pertain and within which these variables must be kept. For example, a process variable representing tank level is limited to the maximum and minimum levels of the actual tank physically achievable. An optimizing function may calculate the costs and/or profits associated with each of the constrained or auxiliary variables to operate at a level in which profit is maximized, costs are minimized, etc. Measurements of these auxiliary variables can then be provided as inputs to the MPC routine and treated by the MPC routine as control variables having a set point equal to the operational point for the auxiliary variable defined by the optimization routine.

Utilizing the predicted steady state in the optimizer makes it possible to perform optimization without calculating modeled process derivatives, which is a complex and error-prone operation. In normal operating conditions, the MPC optimizer provides an optimal economic solution with an acceptable ranges and limits. However, if the solution does not exist within the predefined ranges and limits, the process optimizer is unable to provide a solution. As a consequence, the process optimizer is unable to provide a solution in every circumstance.

Process simulation in an operating process environment has also been used as process design tools, and have successfully found their way to process control, including operator training, control strategy designing and testing, process optimization and related applications. Introduction of concurrent simulation techniques has extended the simulation concept and its areas of applicability. In particular, with concurrent simulation, a process is simulated concurrently with its operation, thereby creating a simulated process "shadow". Various simulation techniques may be used with this approach, from high Fidelity first principal models to the "black box" generic modeling. For example, it is known to implement process simulation using HYSYS (a high fidelity simulation program) when designing a plant and to later use that same simulation to assist in performing plant operations. Concurrent simulation allows continuous feedback updates of the modeling results from the process measurements, resulting in superior performance and fidelity to be achieved, particularly compared to simple modeling techniques, such as step responses when concurrent simulation is not applied. As result, the cost of developing and running simulation is dramatically reduced, and is acceptable for common implementation process control systems. Process control systems with concurrent simulation features improved performance and extended functionality including intensive processing system diagnostics and optimization.

It would be useful to apply optimization at the concurrent simulation in a way to retain advantages of the MPC optimization. It would further be useful to provide a process optimizer that provides a solution in any circumstance, regardless of predefined ranges and limits. Existing recovery techniques are based on the priorities of the constrained and controlled variables. In particular, utilization of penalized slack variables may be useful in always, or almost always, providing a feasible solution to a constraint optimization problem.

SUMMARY

A system and method of optimization with process simulation is provided. In particular, the optimizer uses simulated outputs of the process from the process simulation to develop target values to control the process. The simulated process outputs may be applied to the optimizer up to the steady state of the process, and the optimizer may also utilize real process inputs. Concurrent execution of the process with process operation allows feedback from the actual process to be used to correct the simulation results. The optimizer is utilized concurrently with simulated processes, while maintaining independence between the optimizer and the simulation. These considerations are based on the linear models and multi-objective linear programming optimization. However, additional techniques, such as quadratic programming (QP), nonlinear or linearized optimization techniques may also be applied. The optimization steady state model is built and updated from the dynamic linear or nonlinear simulation models. The optimizer output may apply optimal targets to the process inputs as target manipulated variables or as target control variables.

Optimal solutions to an optimization problem, as defined by the target values, may be determined in any circumstance by extending the search for the optimal solution beyond the primary constraint variables. In particular, the optimizer may utilize an objective function that may include additional flexible variables, also referred to as slack variables, to extend the objective function beyond predefined variable limits. The optimizer minimizes or maximizes the objective function while maintaining control and manipulated variables within the predefined limits. If a solution is not found within the predefined variable limits, a slack variable is applied to the objective function. Inclusion of the slack variable violates the predefined variable limits and extends the search range for the solution beyond the predefined limits. In effect, the inclusion of a slack variable extends the objective function by a degree of freedom beyond the constraint variables.

Inclusion of the slack variables may be applied incrementally, with each application of a slack variable adding a further degree of freedom to the objective function until a solution is found. However, the inclusion of each slack variable may be accompanied by a penalty to try to get the solution within the predefined limits or to exceed the limits as minimally as possible. The values of the penalties may be dependent on the priority of the variable being violated, and in one example may be significantly larger than any costs or profits involved in the optimization process.

As a result of the optimization with process simulation, selection of optimization variables can be significantly simplified, in some cases the correct variables could be selected for the select configuration. In all cases the control strategy, simulation and optimization may reside and interact together so that all parts of target system are associated and referential integrity can be maintained. A linear or nonlinear optimizer has a defined multi-goal objective function and flexible process limits, which may guarantee an optimal solution at any process condition. Optimization performance is improved by using real-time process simulation and by applying measured inputs from the process to the optimizer for predicted steady-state values. A steady state gain matrix is used by the optimizer and updated in real time. The steady state gain matrix may be based upon the simulation model, and in particular, a step response model.

DETAILED DESCRIPTION

Figure 1:
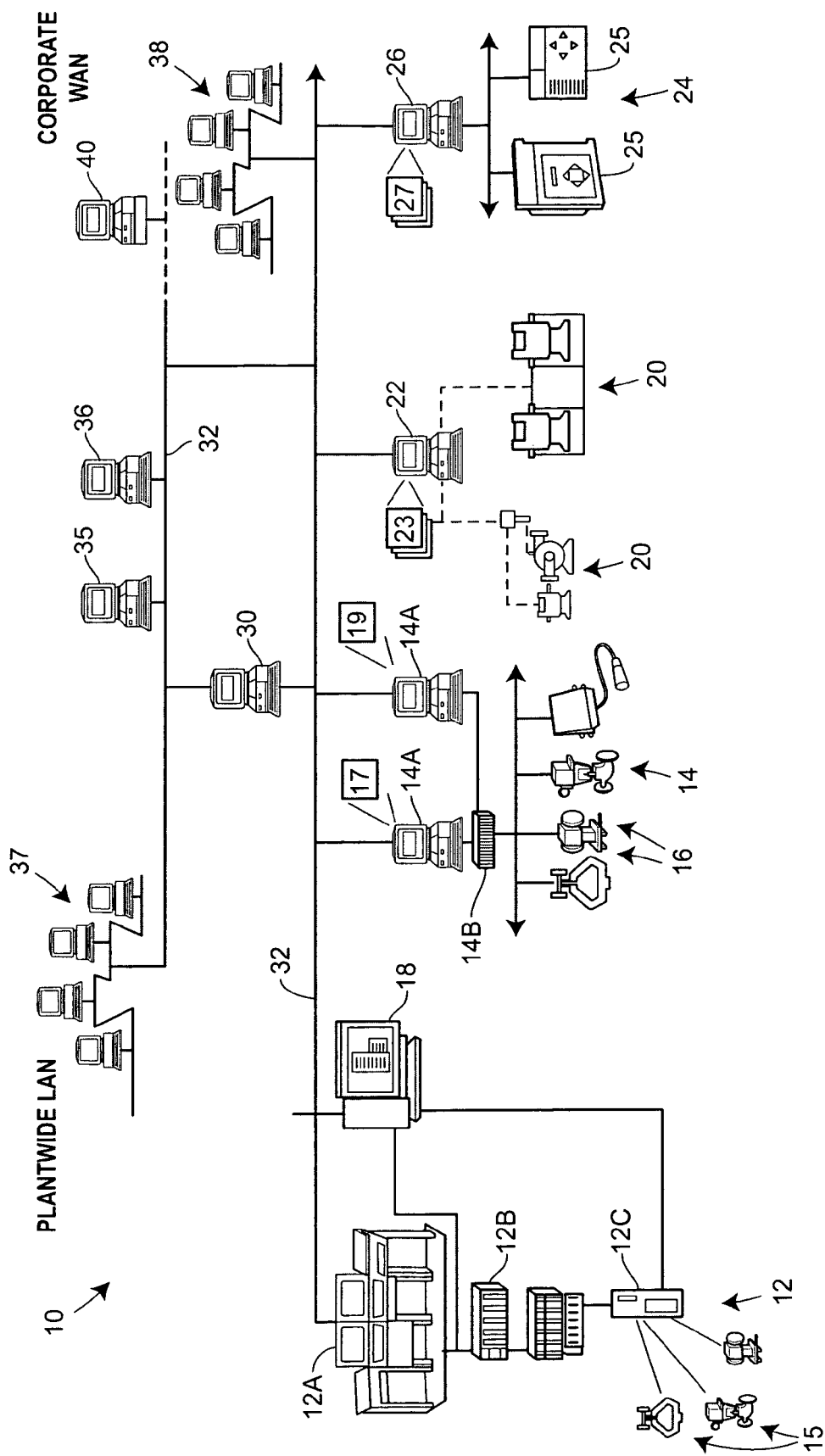
FIG. 1 is a schematic diagram of a process plant displaying an example of a hierarchical structure of equipment and instructions implemented in a process plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, such as DeltaV™, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices, including wireless connections and I/O devices, to one or more field devices 16, such as for example, HART® or Foundation Fieldbus™ field devices or any other smart or non-smart field devices including, for example, those that use any of the PROFIBUS®, WORLDFIP®, Device-Net®, AS-Interface® and CAN® protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the Asset Management System (AMS) application, such as AMS Device Manager sold by Fisher-Rosemount Systems, Inc., or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications 17, 19 such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23, for example RBMware™ sold by CSi Systems of Knoxville, Tenn., AMS Machinery Manager sold by Fisher-Rosemount Systems, Inc. or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25.

A computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications. As illustrated in FIG. 1, the computer 30 is also connected via the same or a different network bus 32 to business system computers and maintenance planning computers 35 and 36. The computer 30 may also be connected via, for example, the bus 32, to a plantwide LAN 37, a corporate WAN 38 as well as to a computer system 40 that enables remote monitoring of or communication with the plant 10 from remote locations. Alternatively, or in addition, the computer system 30 process control system 12, distributed process control system 14, maintenance interface 18, process control and/or maintenance interfaces 14A, rotating equipment maintenance computer 22, and/or the power generation and distribution computer 26 may be interconnected via an internet and communicate via an internet-compatible protocol. Accordingly, the plant 10 may be provided with viewing and control functions via one or more remote facilities which to view and control the various systems, computers and routines within the plant 10.

In addition, remote monitoring facilities may be communicatively coupled to the plant 10 via the internet to provide access to additional analysis and diagnostics resources. In one example, the plant 10 may be coupled to a failure defense planning system, which includes an analysis of the various plant assets and prioritizes the assets according to their importance to the plant or to systems within the plant to provide criticality data.

Figure 2:
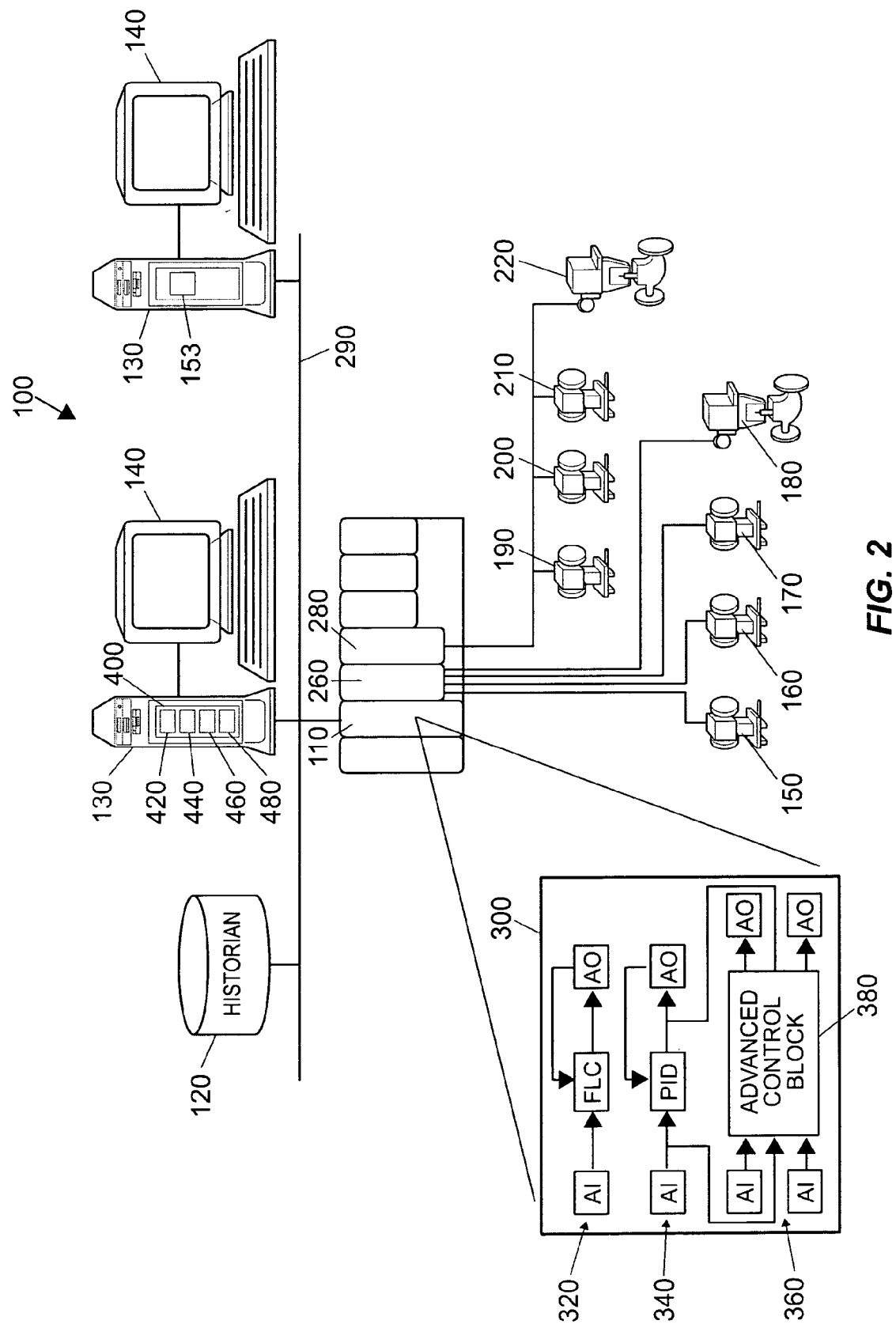
FIG. 2 is a block diagram of an process control system including a control module having an advanced controller function block that integrate an optimizer with an MPC controller.

Referring to FIG. 2, a further example of a process control system 100 utilizing integrated model predictive control and optimization is shown. As an example, the process control system 100 may generally correspond to the process control system 10 from FIG. 1. Although the following describes an example of model predictive control and optimization, a more detailed example of model predictive control and optimization may be found in U.S. Pat. No. 7,050,863 entitled "Integrated Model Predictive Control and Optimization Within a Process Control System" which issued on May 23, 2006, the entire disclosure of which is hereby incorporated by reference herein.

The process control system 100 includes a process controller 110 communicatively connected to a data historian 120 and to one or more host workstations or computers 130 (which may be any type of personal computers, workstations, etc.), each having a display screen 140. The controller 110 is also connected to field devices 150-220 via input/output (I/O) cards 260 and 280. The data historian 120 may be any desired type of data collection unit having any desired type of memory and any desired or known software, hardware or firmware for storing data and may be separate from (as illustrated in FIG. 2) or a part of one of the workstations 130. The controller 110, which may be, by way of example, the DeltaV™ controller sold by Fisher-Rosemount Systems, Inc., is communicatively connected to the host computers 130 and the data historian 120 via, for example, an Ethernet connection or any other desired communication network 290. The communication network 290 may be in the form of a local area network (LAN), a wide area network (WAN), a telecommunications network, etc. and may be implemented using hardwired or wireless technology. The controller 110 is communicatively connected to the field devices 150-220 using any desired hardware and software associated with, for example, standard 4-20 ma devices and/or any smart communication protocol such as the FOUNDATION Fieldbus™ protocol (Fieldbus), the HART protocol, etc.

The field devices 150-220 may be any types of devices, such as sensors, valves, transmitters, positioners, etc. while the I/O cards 260 and 280 may be any types of I/O devices conforming to any desired communication or controller protocol. In the embodiment illustrated in FIG. 2, the field devices 150-180 are standard 4-20 ma devices that communicate over analog lines to the I/O card 260 while the field devices 190-220 are smart devices, such as Foundation Fieldbus™ field devices, that communicate over a digital bus to the I/O card 280 using Fieldbus protocol communications. Of course, the field devices 150-220 could conform to any other desired standard(s) or protocols, including any standards or protocols developed in the future.

The controller 110, which may be one of many distributed controllers within the plant 100 having at least one processor therein, implements or oversees one or more process control routines, which may include control loops, stored therein or otherwise associated therewith. The controller 110 also communicates with the devices 150-220, the host computers 130 and the data historian 120 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc.

may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 110 may be configured to implement a control strategy or control routine in any desired manner.

In one embodiment, the controller 110 implements a control strategy using what are commonly referred to as function blocks, wherein each function block is a part or object of an overall control routine and operates in conjunction with other function blocks (via communications called links) to implement process control loops within the process control system 100. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 100. Of course hybrid and other types of function blocks exist. Function blocks may be stored in and executed by the controller 110, which is typically the case when these function blocks are used for, or are associated with standard 4-20 ma devices and some types of smart field devices such as HART® devices, or may be stored in and implemented by the field devices themselves, which may be the case with Fieldbus devices. While the description of the control system is provided herein using a function block control strategy which uses an object oriented programming paradigm, the control strategy or control loops or modules could also be implemented or designed using other conventions, such as ladder logic, sequential function charts, etc. or using any other desired programming language or paradigm.

As illustrated by the expanded block 300 of FIG. 2, the controller 110 may include a number of single-loop control routines, illustrated as routines 320 and 340, and may implement one or more advanced control loops, illustrated as control loop 360. Each such loop is typically referred to as a control module. The single-loop control routines 320 and 340 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 100. The advanced control loop 360 is illustrated as including an advanced control block 380 having inputs communicatively connected to numerous AI function blocks and outputs communicatively connected to numerous AO function blocks, although the inputs and outputs of the advanced control block 380 may be communicatively connected to any other desired function blocks or control elements to receive other types of inputs and to provide other types of control outputs. As will be described further, the advanced control block 380 may be a control block that integrates a model predictive control routine with an optimizer to perform optimized control of the process or a portion of the process. While the advanced control block 380 will be described herein as including a model predictive control (MPC) block, the advanced control block 380 could include any other multiple-input/multiple-output control routine or procedure, such as a neural network modeling or control routine, a multi-variable fuzzy logic control routine, etc. It will be understood that the function blocks illustrated in FIG. 2, including the advanced control block 380, can be executed by the controller 110 or, alternatively, can be located in and executed by any other processing device, such as one of the workstations 130 or even one of the field devices 190-220.

As illustrated in FIG. 2, one of the workstations 130 includes an advanced control block generation routine 400 that is used to create, download and implement the advanced control block 380. While the advanced control block generation routine 400 may be stored in a memory within the workstation 130 and executed by a processor therein, this routine (or any part thereof) may additionally or alternatively be stored in and executed by any other device within the process control system 100, if so desired. Generally speaking, the advanced control block generation routine 400 includes a control block creation routine 420 that creates an advanced control block as further described herein and that connects this advanced control block into the process control system, a process modeling routine 440 that creates a process model for the process or a portion thereof based on data collected by the advanced control block, a control logic parameter creation routine 460 that creates control logic parameters for the advanced control block from the process model and that stores or downloads these control logic parameters in the advanced control block for use in controlling the process and an optimizer routine 480 that creates an optimizer for use with the advanced control block. It will be understood the routines 420, 440, 460 and 480 can be made up of a series of different routines, such as a first routine that creates an advanced control element having control inputs adapted to receive process outputs and having control outputs adapted to provide control signals to process inputs, a second routine that enables a user to download and communicatively connect the advanced control element within the process control routine (which may be any desired configuration routine), a third routine that uses the advanced control element to provide excitation waveforms to each of the process inputs, a fourth routine that uses the advanced control element to collect data reflecting the response of each of the process outputs to the excitation waveforms, a fifth routine that selects or enables a user to select a set of inputs for the advanced control block, a sixth routine that creates a process model, a seventh routine that develops advanced control logic parameters from the process model, an eighth routine that places the advanced control logic and, if needed, the process model within the advanced control element to enable the advanced control element to control the process and a ninth routine that selects or enables a user to select an optimizer for use in the advanced control block 380.

Figure 3:
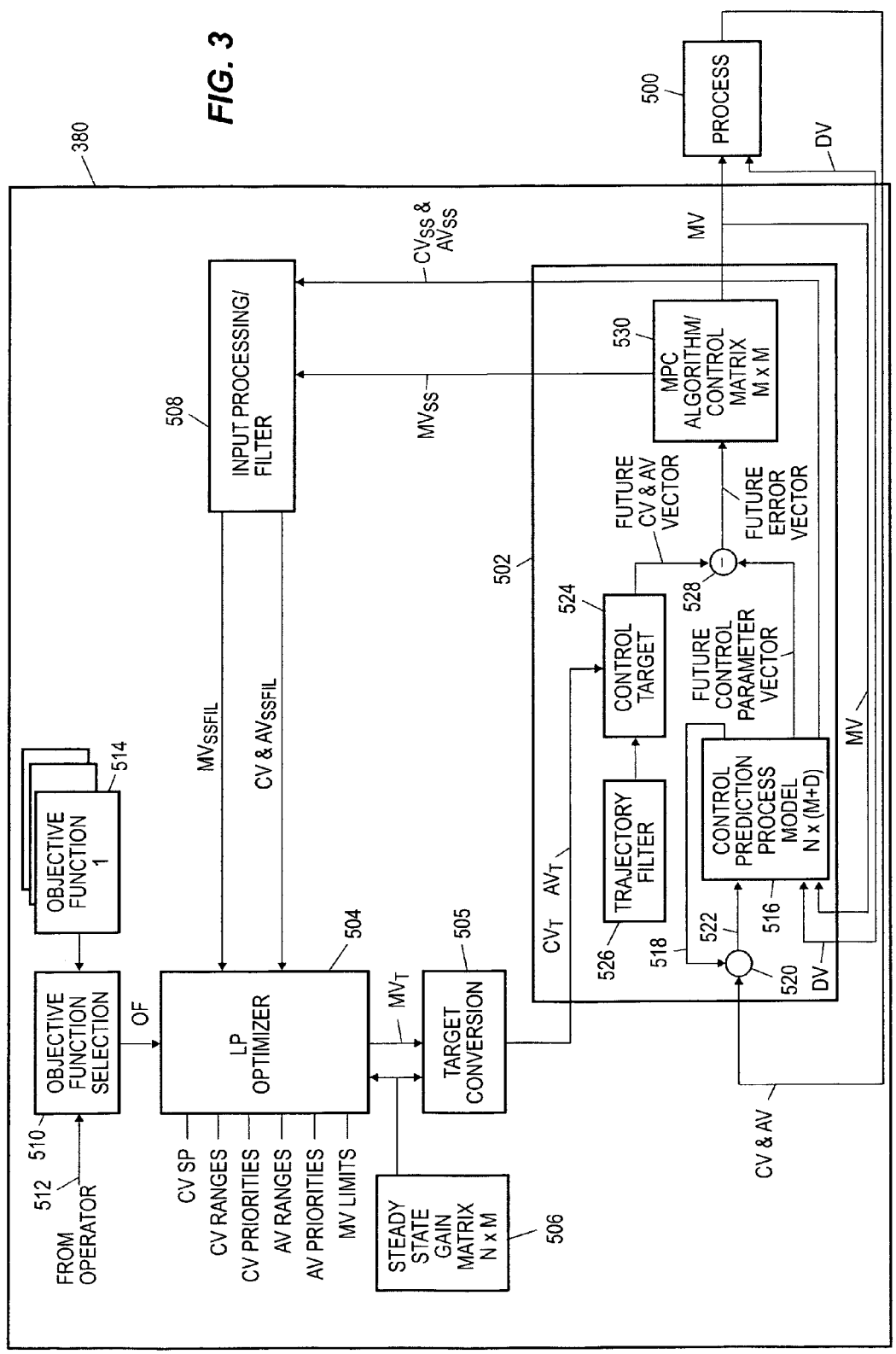
FIG. 3 is a block diagram of the advanced controller function block of FIG. 2 having an integrated optimizer and MPC controller.

FIG. 3 illustrates a more detailed block diagram of one embodiment of the advanced control block 380 communicatively coupled to a process 500, it being understood that the advanced control block 380 produces a set of manipulated variables MVs that are provided to other function blocks which, in turn, are connected to control inputs of the process 500. As illustrated in FIG. 3, the advanced control block 380 includes an MPC controller block 502, an optimizer 504, a target conversion block 505, a step response model or control matrix 506 and a input processing/filter block 508. The MPC controller 502 may be any standard, square M by M (where M can be any number greater than one) MPC routine or procedure having the same number of inputs as outputs. The MPC controller 502 receives, as inputs, a set of N control and auxiliary variables CV and AV (which are vectors of values) as measured within the process 500, a set of disturbance variables DV which are known or expected changes or disturbances provided to the process 500 at some time in the future and a set of steady state target control and auxiliary variables CVT and AVT provided from the target conversion block 505. The MPC controller 502 uses these inputs to create the set of M manipulated variables MV (in the form of control signals) and delivers the manipulated variable MV signals to control the process 500.

Still further, the MPC controller 502 calculates and provides a set of predicted steady state control variables CVSS and auxiliary variables AVSS along with a set of predicted steady state manipulated variables MVSS representing the predicted values of the control variables CV, the auxiliary variables AV and the manipulated variables MV, respectively, at the prediction horizon, to the input processing/filter block 508. The input processing/filter block 508 processes the determined predicted steady state values of the control, auxiliary and manipulated variables CVSS, AVSS and MVSS to reduce the effects of noise and unpredicted disturbances on these variables. It will be understood that the input processing/filter block 508 may include a low pass filter or any other input processing that reduces the effects of noise, modeling errors and disturbances on these values and provides the filtered control, auxiliary and manipulated variables CVSSfil, AVSSfil and MVSSfil to the optimizer 504.

The optimizer 504 is, in this example, a linear programming (LP) optimizer that uses an objective function (OF) that may be provided from a selection block 510 to perform process optimization. Alternatively, the optimizer 504 could be a quadratic programming optimizer which is an optimizer with a linear model and a quadratic objective function. Generally speaking, the objective function OF will specify costs or profits associated with each of a number of control, auxiliary and manipulated variables and the optimizer 504 sets target values for those variables by maximizing or minimizing the objective function. The selection block 510 may select the objective function OF provided to the optimizer 504 as one of a set of pre-stored objective functions 514 which mathematically represent different manners of defining optimal operation of the process 500. For example, one of the pre-stored objective functions 514 may be configured to maximize the profit of the plant, another one of the objective functions 514 may be configured to minimize the use of a particular raw material that is in short supply while a still further one of the objective functions 514 may be configured to maximize the quality of the product being manufactured within the process 500. Generally speaking, the objective function uses a cost or profit associated with each move of a control, auxiliary and manipulated variable to determine the most optimal process operating point within the set of acceptable points as defined by the set point values or ranges of the control variables CV and the limits of the auxiliary and manipulated variables AV and MV. Of course, any desired objective function can be used instead or in addition to those described herein including objective functions which optimize each of a number of concerns, such as use of a raw material, profitability, etc. to some degree.

To select one of the objective functions 514, a user or operator may provide an indication of the objective function 514 to be used by selecting that objective function on an operator or user terminal (such as one of the workstations 130 of FIG. 2) which selection is provided via an input 512 to the selection block 510. In response to the input 512, the selection block 510 provides the selected objective function OF to the optimizer 504. Of course, the user or operator can change the objective function being used during operation of the process. If desired, a default objective function may be used in cases in which the user does not provide or select an objective function. One possible default objective function will be discussed in more detail below. While illustrated as being part of the advanced control block 38, the different objective functions may be stored in the operator terminal 130 of FIG. 2 and one of these objective functions may be provided to the advanced control block 380 during the creation or generation of this block.

In addition to the objective function OF, the optimizer 504 receives, as inputs, a set of control variable set points (which are typically operator specified set points for the control variables CV of the process 500 and may be changed by the operator or other user) and a range and weight or priority associated with each of the control variables CV. The optimizer 504 additionally receives a set of ranges or constraint limits and a set of weights or priorities for the auxiliary variables AV and a set of limits for the manipulated variables MV being used to control the process 500. Generally speaking, the ranges for the auxiliary and manipulated variables define the limits (typically based on physical properties of the plant) for the auxiliary and manipulated variables while the ranges for the control variables provide a range in which the control variables may operate for satisfactory control of the process. The weights for the control and auxiliary variables specify the relative importance of the control variables and the auxiliary variables with respect to one another during the optimization process and may be used, in some circumstances, to enable the optimizer 504 to generate a control target solution if some of the constraints are violated.

During operation, the optimizer 504 may use a linear programming (LP) technique to perform optimization. For process units with a number of manipulated inputs (independent variables) and a number of controlled or constraint "(dependent variables), optimization techniques are useful control technologies. One approach utilizes linear programming (LP) with steady-state models. A simulation environment, such as model predictive control, have the process steady state readily available. As is known, linear programming is a mathematical technique for solving a set of linear equations and inequalities that maximizes or minimizes a certain additional function called the objective function. The objective function in its final form is a function of the independent manipulated variables, $mv_i$, or increments of the independent manipulated variables, $\delta mv_i$:

$$Q = c_1 mv_1 + c_2 mv_2 + \ldots + c_m mv_m$$

where $c_i$ is a cost or profit associated with the $mv_i$ unit change. Generally, the original objective function may be built as a blend of user optimization objectives both on the inputs, MV, and the outputs, CV. The original objective function may be derived from the equation:

$$Q_{min} = UCT^T * \Delta CV(t+p) + UMV^T * \Delta MV(t+c)$$

where $\Delta CV(t+p)$ is a vector of control variable increments (process outputs) at the end of the prediction horizon, $\Delta MV(t+c)$ is a vector of manipulated variable increments at the end of the control horizon, and UCT and UMV are vectors of unit cost for CV and MV, respectively. It may be assumed that all CV variables are positioned at the end of the prediction horizon and all MV variables are at the end of the control horizon, even if time variables are not used in the above equations.

The vector notation of the above equation represents many objective functions. In particular, the objective for every $cv_i$ can be represented as a separate objective function in the form of:

$$q_i = uct_i * \delta cv_i = uct_i(a_{i1}\delta mv_1 + a_{i2}\delta mv_2 + \ldots + a_{im}\delta mv_m)$$
$$= c_1 \delta mv_1 + c_2 \delta mv_2 + \ldots + c_m \delta mv_m = q_i(\Delta MV)$$

where $\alpha_{ij}$ are process model gain coefficients relating the process output i and the process input j. As a result, the original objective function may be expressed as:

$$Q_{\min} = \sum_1^m q_i(\Delta MV) + q_{m+1}(\Delta MV) = \sum_1^{m+1} q_i(\Delta MV)$$

This form of the objective function corresponds to a non-normalized weighted sum multi-objective function.

As discussed above, the objective function may express economic value like cost or profit but may express other objectives instead. Further, as will be understood, the steady state gain matrix defines the steady state gain for each possible pair of the manipulated variables and the control or auxiliary variables. In other words, the steady state gain matrix defines the steady state gain in each control and auxiliary variable for a unit change in each of the manipulated and disturbance variables. This steady state gain matrix is generally an N by M matrix, where N is the number of control and auxiliary variables and M is the number of manipulated variables used in the optimizer routine. Generally, N can be greater than, equal to, or less than M, with the most common case being that N is greater than M.

Using any known or standard LP algorithm or technique, the optimizer 504 iterates to determine the set of target manipulated variables MVT (as determined from the steady state gain matrix) which maximize or minimize the selected objective function OF while resulting an process operation that meets or falls within the control variable CV set point range limits, the auxiliary variable AV constraint limits and the manipulated variable MV limits. In one embodiment, the optimizer 504 actually determines the change in the manipulated variables and uses the indication of the predicted steady state control variables, auxiliary variables and manipulated variables CVSSfil, AVSSfil and MVssfil to determine the changes in the process operation from its current operation, that is, to determine the dynamic operation of the MPC control routine during the process of reaching the target or optimal process operating point. This dynamic operation is important as it is necessary to assure that none of the constraint limits is violated during the move from the current operating point to the target operating point.

In one embodiment, the LP optimizer 504 may be designed to minimize the objective function of the following form:

$$Q = P^t * A * \Delta MV + C^t \Delta MV$$

where Q is the total cost/profit, P is the profit vector associated with the AVs and CVs, C is the cost vector associated with MVs, A is the Gain matrix, and AMV is the vector for calculated change in MVs.

Assuming that the objective function is minimized, the profit values are set negative numbers and the cost values are set positive numbers to indicate their influence on the objective. Using this objective function, the LP optimizer 504 calculates the changes in the manipulated variables MV that minimize the objective function while insuring that the control variables CV remain within a range from their target set point, that the auxiliary variables AV are within their upper and lower constraint limits and that the manipulated variables MV are within their upper and lower limits.

Process modeling techniques based on step responses and utilized in model predictive control apply increments of the manipulated variables (MV) over the control horizon resulting in incremental values of controlled and constrained values (CV) at the end of the prediction horizon. In one optimization procedure that can be used, incremental values of manipulated variables are used at the present time (t) and a sum of increments of manipulated variables are used over the control horizon with incremental values of control and auxiliary variables being determined at the end of prediction horizon, instead of positional current values, as is typical in LP applications. Of course, the LP algorithm may be appropriately modified for this variation. In any event, the LP optimizer 504 may use a steady state model and, as a result, a steady state condition is required for its application and the steady state condition at the end of the prediction horizon is available in the process modeling. With a prediction horizon as normally used in MPC design, future steady state is guaranteed for a self-regulating process. One possible predicted process steady state equation for an m by n input-output process, with prediction horizon p, control horizon c, expressed in the incremental form is:

$$\Delta CV(t+p) = A * \Delta MV(t+c)$$

where:

$$\Delta CV(t+p) = \begin{bmatrix} \Delta cv_1 \\ \ldots \\ \Delta cv_n \end{bmatrix}$$

denotes the vector of the predicted changes in outputs at the end of prediction horizon (t+p), $$A = \begin{bmatrix} a_{11} & \ldots & a_{1m} \\ \vdots & \ddots & \vdots \\ a_{n1} & \ldots & a_{nm} \end{bmatrix}$$

is the process steady state n by m gains matrix, where $\alpha_{nm}$ are process model steady state gain coefficients relating process output i and process input j between output n and input m, and $$\Delta MV(t+c) = \begin{bmatrix} \Delta mv_1 \\ \ldots \\ \Delta mv_m \end{bmatrix}$$

denotes the vector of the changes in manipulated variables at the end of control horizon (t+c).

The vector $\Delta MV(t+c)$ represents the sum of the changes over control horizon made by every controller output $mv_i$ so that the change in each controller output may be expressed as:

$$\Delta mv_i = \sum_{j=1}^{c} mv_i(t+j) \; i = 1, 2, \ldots, m.$$

The changes should satisfy limits on both the manipulated variables MVs and the control variables CVs (here auxiliary variables are treated as control variables):

$$MV_{min} \leq MV_{current} + \Delta MV(t+c) \leq MV_{max}$$

$$CV_{min} \leq CV_{predicted} + \Delta CV(t+p) = CV_{predicted} + A*\Delta MV(t+c) \leq CV_{max}$$

In this case, the objective function for maximizing product value and minimizing raw material cost can be defined jointly as:

$$\min Q = -UCV^T * \Delta CV(t+p) + UMV^T * \Delta MV(t+c)$$

where UCV is the cost vector for a unit change in the control variable CV process value, and UMV is the cost vector for a unit change in the manipulated variables MV process value.

Applying the first equation above, the objective function can be expressed in terms of manipulated variables MV as:

$$\min Q = -UCV^T * A * \Delta MV(t+c) + UMV^T * \Delta MV(t+c)$$

To find an optimal solution, the LP algorithm calculates the objective function for an initial vertex in the region defined by this equation and improves the solution every next step until the algorithm determines the vertex with the maximum (or minimum) value of the objective function as an optimal solution. The determined optimal manipulated variable values are applied as the target manipulated variables MVT to be achieved within control horizon.

Generally speaking, running the LP algorithm on the prepared matrix returns three possible results. First, there is a unique solution for the target manipulated variables MVT. Second, the solution is unbounded, which should not happen if each control and auxiliary variable has a high and a low limit. Third, there is no solution, which means the boundaries or constraints on the auxiliary variables are too tight. To handle the third case, the overall constraints may be relaxed to obtain a solution. The basic assumption is that limits on manipulated variables (Hi/Lo limits) can not be changed by optimizer. The same is true for constraint or limits of the auxiliary variable (Hi/Lo limits). However, the optimizer can change from driving the control variable CV to the specified set points (CV set point control) to driving the control variables to any of the values within a range from or around the set point (CV range control). In this case, the values of the control variables are allowed to be placed within a range rather than at a specific set point. If there are several auxiliary variables AV violating their constraints, and switching from CV set point control to CV range control does not provide a solution, it is also possible to relax or to ignore the constraints of the auxiliary variables based on the provided weights or priority designations. In one embodiment, a solution could be determined by minimizing the squared error of the auxiliary variables allowing each of them to violate their respective constraint or by abandoning constraints of the auxiliary variables with lowest priority in a sequential manner.

As noted above, the objective function OF may be chosen or set by default by the control block generation program 400. One method of establishing such a default setting is provided below. In particular, while it is desirable to provide the ability to optimize, many situations may only require that set points for the control variables be maintained in a manner that still observes the operating constraints of the auxiliary variables and manipulated variables. For these applications, the block 380 may be configured to operate solely as an MPC function block. To provide this ease of use, a default "Operate" objective function may be automatically created with default costs assigned to the different variables therein along with default auxiliary variable AV weights. These defaults may set all costs for the auxiliary variables AV and the manipulated variables MV equal or provide some other predetermined cost assignment to the auxiliary and manipulated variables AV and MV. When an expert option is selected, then the user may create additional optimization selections and define their associated costs for the different objective functions 514. The expert user will also be allowed to modify the default auxiliary variable and control variable AV and CV weights of the default objective function.

In one embodiment when, for example, economics are not defined for the process configuration, the objective function may be constructed from the MPC configuration automatically. In general, the objective function may be constructed using the following formula:

$$CD^T = C^T + P^T * A = [C_1, \ldots, C_j, \ldots, C_m] +$$
$$\left[ \sum_{i=1}^{n} p_i a_{i1}, \sum_{i=1}^{n} p_i a_{i2}, \ldots, \sum_{i=1}^{n} p_i a_{im}, \right] = [CD_1, \ldots, CD_j, \ldots, CD_m]$$

The variables $C_j$ and $p_j$ can be defined from the configuration settings. In particular, assuming that the control variable CV set point can be defined at LL or HL only, the $p_j$ value is defined in the following way:

$p_j = -1$ if set point is defined at LL or minimize was selected; and $p_j = 1$ if set point is defined at HL or maximize was selected.

Assuming no configuration information is entered for the auxiliary variables AV, $p_j = 0$ for all auxiliary variables AV. Similarly for the manipulated variables MV, the $C_j$ value depends on whether or not the preferred manipulated variable target $MV_T$ is defined. Where the preferred manipulated target $MV_T$ is defined:

$C_j = 1$ if $MV_T$ is at the HL (high limit) or maximize was selected, $C_j = -1$ if $MV_T$ is at the LL (low limit) or minimize was selected, and $C_j = 0$ if $MV_T$ is not defined If desired, the selection of the use of the optimizer 504 in conjunction with the MPC controller 502 may be adjustable to thereby provide a degree of optimization. To perform this function, the change in the manipulated variables MV used by the controller 502 can be altered by applying different weights to the change in the manipulated variables MV determined by the MPC controller 502 and the optimizer 504. Such a weighted combination of the manipulated variables MV is referred to herein as an effective MV ($MV_{eff}$). The effective $MV_{eff}$ can be determined as:

$$\Delta MV_{eff} = \Delta MV_{mpe}\left(\frac{\alpha}{S}\right) + \Delta MV_{opt}(1-\alpha) \quad 0 \leq \alpha \leq 1,$$

where S is arbitrarily or heuristically selected. Typically, S will be greater than one and may be in the range of ten.

Here, with $\alpha = 0$, the optimizer contributes to the effective output as it was set at the generation. With $\alpha = 1$, the controller provides MPC dynamic control only. Of course, the range between 0 and 1 provides different contributions of optimizer and MPC control.

The above described default objective function may be used to establish the operation of the optimizer during different possible operational modes thereof. In particular, when the number of control variables CVs match the number of manipulated variables MVs, the expected behavior with the default setting is that the control variable CV set points will be maintained as long as auxiliary variables AVs and the manipulated variables MVs are projected to be within their limits. If it is predicted that an auxiliary variable or a manipulated variable will violate its limit, then the control variable working set points will be changed within their range to prevent these limits from being violated. If, in this case, the optimizer 504 can not find a solution that satisfies auxiliary and manipulated variable limits while maintaining the control variables within their range, then control variables will be maintained within their range while the auxiliary variables are allowed to deviate from their constraint limits. In finding the best solution, those auxiliary variables AVs that are projected to violate a limit will be treated equally and their average limit deviation minimized.

To achieve this behavior, the default cost/profit used by the objective function will automatically be set such that the control variables CV will be assigned a profit of 1 if the range is defined to allow deviation below the set point and a profit of −1 if the range is defined to allow deviation above the set point. The auxiliary variables AVs within limits will be assigned a profit of 0 and the manipulated variables MVs will be assigned a cost of 0.

When the number of control variables CVs is less than number of manipulated variables MVs, then the extra degrees of freedom can be used to address the requirements associated with the configured manipulated variable's MV final resting position. Here, the control variable set points (if any control variables CVs are defined) will be maintained as long as the auxiliary and manipulated variables are projected to be within their limits. The average deviation of the manipulated variables from the configured final resting position will be minimized. If it is predicted that one or more of the auxiliary and manipulated variables will violate its limit, then the control variable working set points will be changed within their ranges to prevent these limits from being violated. Under this condition, if multiple solutions exist, then the one used for the control will minimize the average deviation of the manipulated variables from the configured final resting position.

When the optimizer 504 can not find a solution (i.e., a solution does not exist) that satisfies the auxiliary and manipulated variables limits while maintaining the control variables within their range, then the control variables will be maintained within range while the auxiliary variables are allowed to deviate from their constraint limits. In finding the best solution, those auxiliary variables that are projected to violate a limit will be treated equally and their average limit deviation minimized. To achieve this behavior, the default cost/profit used by objective function will automatically be set so that the control variables will be assigned a profit of 1 if the range is defined to allow deviation below the set point and −1 if the range is defined to allow deviation above the set point. The auxiliary variables will be assigned a profit of 1 or −1 and the manipulated variables will be assigned a cost of 0.1.

In any event, after operation, the optimizer 504 provides the set of optimal or target manipulated variables MVT to the target conversion block 505 which uses the steady state gain matrix to determine the target steady state control and auxiliary variables that result from the target manipulated variables MVT. This conversion is computationally straightforward, as the steady state gain matrix defines the interactions between the manipulated variables and the control and auxiliary variables and thereby can be used to uniquely determine the target control and auxiliary variables CVT and AVT from the defined target (steady state) manipulated variables MVT.

Once determined, at least of a subset of N of the target control and auxiliary variables CVT and AVT are provided as inputs to the MPC controller 52 which, as noted previously, uses these target values CVT and AVT to determine a new set of steady state manipulated variables (over the control horizon) MVSS which drives the current control and auxiliary variables CV and AV to the target values CVT and AVT at the end of the prediction horizon. Of course, as is known, the MPC controller changes the manipulated variables in steps in an attempt to reach the steady state values for these variables MVSS which, theoretically, will be the target manipulated variables MVT determined by the optimizer 504. Because the optimizer 504 and MPC controller 502 operate as described above during each process scan, the target values of the manipulated variables MVT may change from scan to scan and, as a result, the MPC controller may never actually reach any particular one of these sets of target manipulated variables MVT, especially in the presence of noise, unexpected disturbances, changes in the process 500, etc. However, the optimizer 504 is always driving the controller 502 to move the manipulated variables MV towards an optimal solution.

As is known, the MPC controller 502 includes a control prediction process model 516, which may be an N by M+D step response matrix (where N is the number of control variables CV plus the number of auxiliary variables AV, M is the number of manipulated variables MV and D is the number of disturbance variables DV). The control prediction process model 516 produces on an output 520 a previously calculated prediction for each of the control and auxiliary variables CV and AV and a vector summer 520 subtracts these predicted values for the current time from the actual measured values of the control and auxiliary variables CV and AV to produce an error or correction vector on the input 522.

The control prediction process model 516 then uses the N by M+D step response matrix to predict a future control parameter for each of the control variables and auxiliary variables CV and AV over the prediction horizon based on the disturbance and manipulated variables provided to other inputs of the control prediction process model 516. The control prediction process model 516 also provides the predicted steady state values of the control variables and the auxiliary variables CVSS and AVSS to the input processing/filter block 508.

A control target block 524 determines a control target vector for each of the N target control and auxiliary variables CVT and AVT provided thereto by the target conversion block 505 using a trajectory filter 526 previously established for the block 380. In particular, the trajectory filter provides a unit vector defining the manner in which control and auxiliary variables are to be driven to their target values over time. The control target block 524 uses this unit vector and the target variables CVT and AVT to produce a dynamic control target vector for each of the control and auxiliary variables defining the changes in the target variables CVT and AVT over time period defined by the prediction horizon time. A vector summer 528 then subtracts the future control parameter vector for each of the control and auxiliary variables CV and AV from the dynamic control vectors to define an error vector for each of the control and auxiliary variables CV and AV. The future error vector for each of the control and auxiliary variables CV and AV is then provided to the MPC algorithm which operates to select the manipulated variable MV steps that minimize the, for example, least squared error, over the control horizon for manipulated variables MV and the prediction horizon for control variables and auxiliary variables CV and AV. Of course, the MPC algorithm or controller uses an M by M process model or control matrix developed from relationships between the N control and auxiliary variables input to the MPC controller 502 and the M manipulated variables output by the MPC controller 502.

More particularly, the MPC algorithm working with the optimizer has two main objectives. First, the MPC algorithm tries to minimize CV control error with minimal MV moves, within operational constraints and, second, tries to achieve optimal steady state MV values set up by optimizer and the target CV values calculated directly from the optimal steady state MV values.

To satisfy these objectives, the original unconstrained MPC algorithm can be extended to include MV targets into the least square solution. The objective function for this MPC controller is:

$$\min_{\Delta MV(k)} \left\{ \begin{array}{c} \|\Gamma^y [CV(k) - R(k)]\|^2 + \\ \|\Gamma^u \Delta MV(k)\|^2 + \|\Gamma^o [\sum \Delta MV(k) - \Delta MVT]\|^2 \end{array} \right\}$$

where CV(k) is the controlled output p-step ahead prediction vector, R(k) is the p-step ahead reference trajectory (set point) vector, $\Delta MV(k)$ is the c-step ahead incremental control moves vector, $\Gamma^y_1 = \text{diag}\{\Gamma^y_1, \ldots, \Gamma^y_p\}$ is a penalty matrix on the controlled output error, $\Gamma^u = \text{diag}\{\Gamma^u_1, \ldots, \Gamma^u_c\}$ is a penalty matrix on the control moves, p is the prediction horizon (number of steps), c is the control horizon (number of steps), and $\Gamma^o$ is a penalty on error of the sum of controller output moves over control horizon relative to the target optimal change of MV defined by the optimizer. For the simplicity of notation, the objective function is shown for single-input/single-output (SISO) control.

As will be understood, the first two terms are the objective function for the unconstrained MPC controller while the third term sets up an additional condition that makes the sum of the controller output moves equal to the optimal targets. In other words, the first two terms set up objectives for controller dynamic operation while the third term sets up steady state optimization objectives.

It will be noted that the general solution for this controller, similar to that for the unconstrained MPC controller, can be expressed as:

$$\Delta MV(k) = (S^{uT} \Gamma^T \Gamma S^u + \Gamma^{uT} \Gamma^u)^{-1} S^{uT} \Gamma^T \Gamma E_{p+1}(k) = K_{ompc} \cdot E_{p+1}(k)$$

where $\Delta MV(k)$ is the change in MPC controller output at the time k, $K_{ompc}$ is the optimized MPC controller gain, $S^u$ is the process dynamic matrix built from the step responses of dimension p×c for a SISO model and p*n×c*m for a multiple-input/multiple-output MIMO model with m manipulated inputs and n controlled outputs.

For optimized MPC, the dynamic matrix is extended to the size: (p+1)×m for SISO model and (p+m)*n×c*m for MIMO model, to accommodate the MV error. $E_{p+1}(k)$ is the CV error vector over the prediction horizon and error of the sum of controller output moves over control horizon relative to the target optimal change of MV. The matrix F combines the matrix $\Gamma^y$ and $\Gamma^o$ and is a square matrix of dimension (p+1) for a SISO controller and [n(p+m)] for the multivariable controller. Superscript T denotes a transposed matrix.

It has been determined that, because the optimizer 504 is optimizing based on all of the control and auxiliary variables CV and AV to determine a target set of manipulated variables MVT defining a unique optimal operating point, it does not matter that the MPC controller 502 is only operating using a subset of the control and auxiliary variables CV and AV in its control matrix to actually produce the manipulated variables MV output therefrom because, when the controller 502 drives the selected subset of control and auxiliary variables CV and AV to their associated targets, the others of the complete set of control and auxiliary variables will be at their target values as well. As a result, it has been determined that a square (M by M) MPC controller with an M by M control matrix can be used with an optimizer that uses a rectangular (N by M) process model to perform process optimization. This enables standard MPC control techniques to be used with standard optimization techniques without having to invert a non-square matrix with the attendant approximations and risks associated with such conversion techniques in a controller.

The optimal manipulated variable input (MV) values are applied to local MV loops as set points, if CV is in manual or feed-forward control. If CV is in automatic feedback control, then the optimal CV values are applied as the target values (set points) to be achieved with the prediction horizon. In one embodiment, when the MPC controller is squared, i.e., the number of manipulated variables MV is equal to the number of control variables CV, then the manipulated variable MV target can be effectively achieved by changes in CV values as follows:

$$\Delta CV = A^* \Delta MVT$$

where $\Delta MVT$ is the optimal target change of MV, and $\Delta CV$ is the CV change to achieve optimal MV. CV change is implemented by managing CV set points.

In operation, the optimizer 504 sets up and updates the steady state targets for the MPC unconstrained controller at every scan. Thus, the MPC controller 502 executes the unconstrained algorithm. Because the targets $CV_T$ and $AV_T$ are set in a manner that accounts for constraints, as long as a feasible solution exists, the controller works within constraint limits. Optimization, therefore, is an integral part of the MPC controller.

Figure 4:
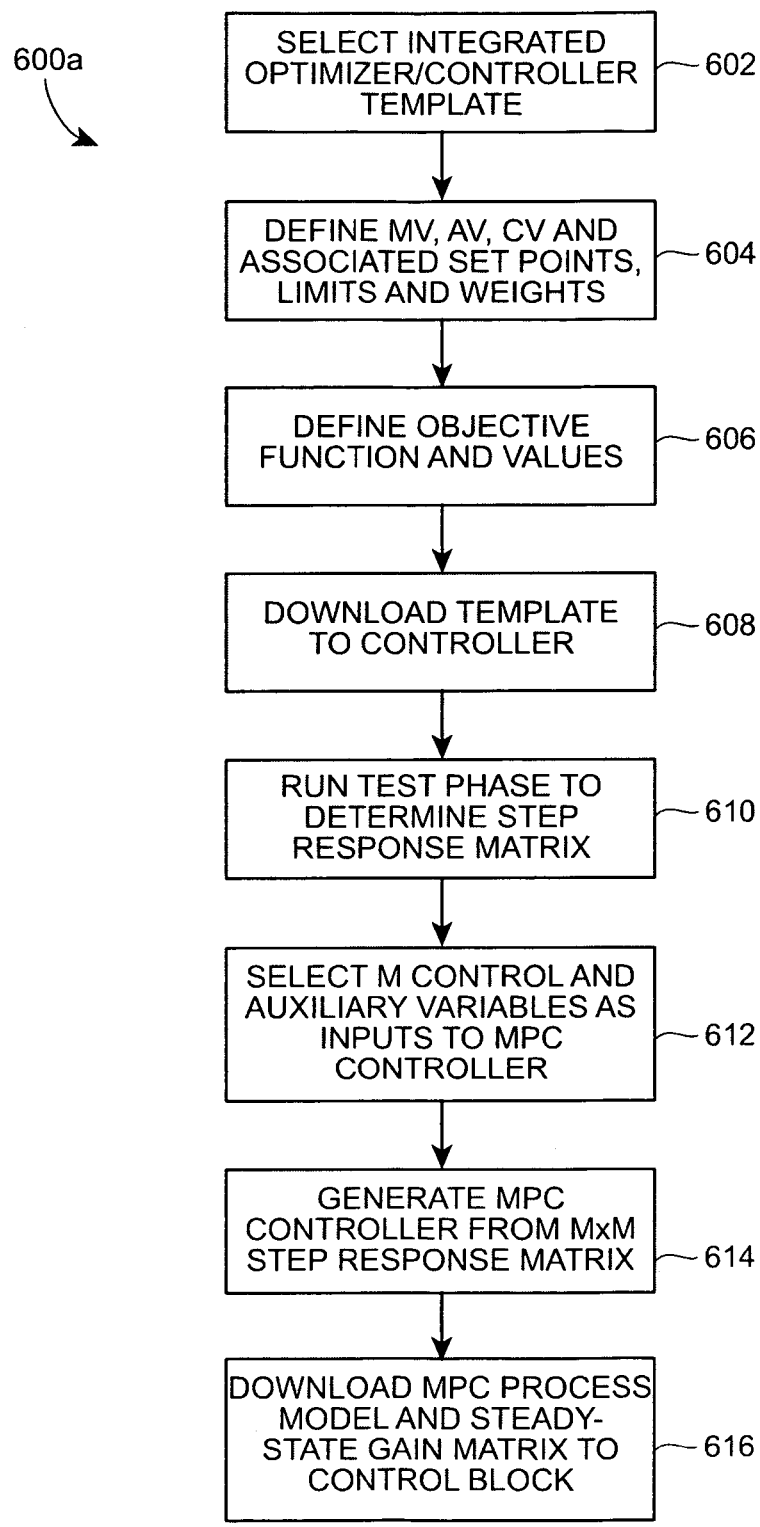
FIG. 4 is a flow chart illustrating a manner of creating and installing the integrated optimizer and MPC controller function block of FIG. 3.
Figure 5:
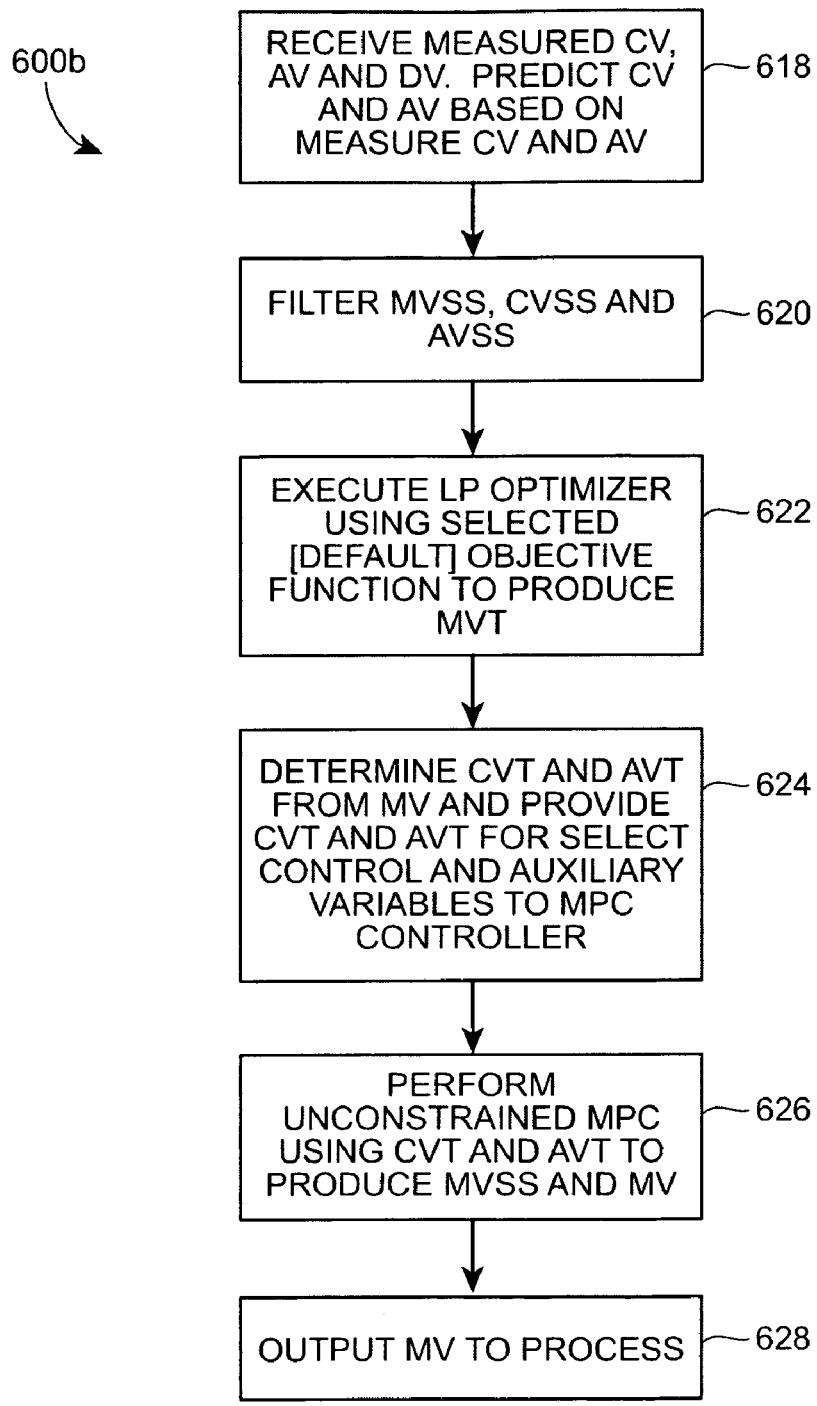
FIG. 5 is a flow chart illustrating the operation of the integrated optimizer and MPC controller of FIG. 3 during on-line process operation.

FIGS. 4 and 5 depict a flow chart 600 illustrating the steps used to perform integrated model predictive control and optimization. The flow chart 600 is generally divided into two sections 600a (FIG. 4) and 600b (FIG. 5) illustrating functions which occur prior to process operation (600a) and functions which occur during process operation (600b), e.g., during every scan of process operation. Prior to process operation, an operator or engineer takes a number of steps to create the advanced control block 380 including an integrated MPC controller and optimizer. In particular, at a block 602, an advanced control template may be selected for use as the advanced control block 38. The template may be stored in and copied from a library within a configuration application on the user interface 130 and may include the general mathematics and logic functions of the MPC controller routine 520 and optimizer 540 without the particular MPC, process models and steady state gain or control matrices and the particular objective function. This advanced control template may be placed in a module having other blocks, such as input and output blocks configured to communicate with devices within the process 500, as well as other types of function blocks, such as control blocks, including PID, neural network and fuzzy logic control blocks. It will be understood that, in one embodiment, the blocks within a module are each objects within an object oriented programming paradigm having inputs and outputs thereof connected to each other to perform communications between the blocks. During operation, the processor running the module executes each of the blocks in sequence at a different time using the inputs to the blocks to produce the outputs of the blocks which are then provided to the inputs of other blocks as defined by the specified communication links between the blocks.

At a block 604, the operator defines the particular manipulated variables, control variables, constrained variables and disturbance variables to be used in the block 380. If desired, in a configuration program, such as the program 400 of FIG. 2, the user may view the control template, select inputs and outputs to be named and configured, browse using any standard browser within the configuration environment to find the actual inputs and outputs within the control system and select these actual control variables as the input and output control variables for the control template.

After selecting the inputs and outputs to the advanced control function block, the user may define the set points associated with the control variables, the ranges or limits associated with the control variables, the auxiliary variables, and the manipulated variables, and the weights associated with each of the control, auxiliary and manipulated variables. Of course, some of this information, such as constraint limits or ranges may already be associated with these variables as these variables are selected or found within the process control system configuration environment. If desired, at a block 606 of FIG. 4, the operator may configure the one or more objective functions to be used within the optimizer by specifying the unit costs and/or profits for each of the manipulated variables, the control variables and the auxiliary variables. Of course, at this point, the operator may select to use the default objective function as described above.

After the inputs (control, auxiliary and disturbance variables) are named and tied to the advanced control template and the weights, limits and setpoints are associated therewith, at a block 608 of FIG. 4, the advanced control template is downloaded into a selected controller within the process as a function block to be used for control. The general nature of the control block, and the manner of configuring this control block is described in U.S. Pat. No. 6,445,6063, entitled "Integrated Advanced Control Blocks in Process Control Systems," which is assigned to the assignee hereof and which is hereby expressly incorporated by reference herein. While this patent describes the nature of creating an MPC controller within a process control system and does not discuss the manner in which an optimizer can be connected to that controller, it will be understood that the general steps taken to connect and configure the controller can be used for the control block 380 described herein with the template including all of the logic elements discussed herein for the control block 380 instead of just those described in this patent.

In any event, after the advanced control template is downloaded into the controller, the operator may, at a block 610, select to run a test phase of the control template to generate the step response matrix and the process model to be used within the MPC controller algorithm. As described in the patent identified above, during the test phase, control logic within the advanced control block 380 provides a series of pseudo-random waveforms to the process as the manipulated variables and observes the changes in the control and auxiliary variables (which are treated by the MPC controller essentially as control variables). If desired, the manipulated and disturbance variables, as well as the control and auxiliary variables may be collected by the historian 120 of FIG. 2 and the operator may set up the configuration program 400 (FIG. 2) to obtain this data from the historian 120 and to perform trending on this data in any manner to obtain or determine the matrix of step responses, each step response identifying the response in time of one of the control or auxiliary variables to a unit change in one (and only one) of the manipulated and control variables. This unit change is generally a step change, but could be another type of change such as an impulse or ramped change. On the other hand, if desired, the control block 380 may generate the step response matrix in response to the data collected when applying the pseudo-random waveforms to the process 500 and then provide these waveforms to the operator interface 130 being used by the operator or user creating and installing the advanced control block 380.

The test routine may provide the operator with plots of the collected and trended data which enable the operator to direct the creation of the step response curves and, therefore, the process model or control matrix used in the MPC controller of the advanced control block. Prior to creating a process model for the advanced control block, the operator may specify the data to be used from trending plots. In particular, the operator may specify beginning and ending points and of the plot as the data to be used to create the step response. Of course, the user could include or exclude any desired data and may perform these functions for each of a number of trend plots, with the different trend plots being associated with, for example, different manipulated variables, control variables, auxiliary variables, etc.

To create a set of step responses, the creation routine will use the selected data from the tend plots to generate a set of step responses, with each step response indicating the response of one of the control or auxiliary variables to one of the manipulated or disturbance variables. This generation process is well known and will not be described herein in any further detail.

After the step response matrix is created, in the case in which the control and auxiliary variables outnumber the manipulated variables, the step response matrix is used to select the subset of control and auxiliary variables that will be used within the MPC algorithm as the M by M process model or control matrix to be inverted and used within the MPC controller 520. This selection process may be performed manually by the operator or automatically by a routine within, for example, the user interface 130 having access to the step response matrix. Generally speaking, a single one of the control and auxiliary variables will be identified as being the most closely related to a single one of the manipulated variables. Thus, a single and unique (i.e., different) one of the control or auxiliary variables (which are inputs to the process controller) will be associated with each of the different manipulated variables (which are the outputs of the process controller) so that that the MPC algorithm can be based on a process model created from an M by M set of step responses.

In one embodiment which uses a heuristic approach in providing pairing, the automatic routine or the operator will select the set of M (where M equals the number of manipulated variables) control and auxiliary variables in an attempt to select the single control or auxiliary variable that has some combination of the largest gain and fastest response time to a unit change in a particular one of the manipulated variables and pair these two variables. Of course, in some cases, a particular control or auxiliary variable may have a large gain and fast response time to multiple manipulated variables. Here, that control or auxiliary variable may be paired with any of the associated manipulated variables and may, in fact, be paired with a manipulated variable that does not produce the largest gain and fastest response time because, in the aggregate, the manipulated variable that causes the lesser gain or slower response time may not effect any other control or auxiliary variable to an acceptable degree. Thus, the pairs of manipulated variables on the one hand and the control or auxiliary variables on the other hand are chosen to, in an overall sense, pair the manipulated variables with the subset of control and auxiliary variables that represent the most responsive control variables to the manipulated variables. Still further, it doesn't matter if all of the control variables are not selected as one of the subset of M control and auxiliary variables and that, therefore, the MPC controller does not receive all of the control variables as inputs thereto, because the set of control and auxiliary variable targets are chosen by the optimizer to represent an operating point of the process at which the non-chosen control (as well as the non-chosen auxiliary) variables are at their set point or within their provided range of operation.

Of course, because there may be tens and even hundreds of control and auxiliary variables on the one hand and tens or hundreds of manipulated variables on the other hand, it can be difficult to select the set of control variables and auxiliary variables that have the best response to each of the different manipulated variables, at least from a visualization standpoint. To overcome this problem, the advanced control block generation routine 400 within the operator interface 130 may include or present a set of screen displays to the user or operator to help or enable the operator to make appropriate selections of the control and auxiliary variables that should be used as the subset of control and auxiliary variables to be used in the MPC controller 520 during operation.

Thus, at a block 612 illustrated in FIG. 4, the operator may be presented with a screen in which the operator can view the response of each of the control and auxiliary variables to a particular or selected one of the manipulated variables. The operator may view the step responses of each of the control and auxiliary variables to each of the different manipulated variables and, during the process, select the one control or auxiliary variable that is best responsive to that manipulated variable. Typically, the operator will try to choose the control or manipulated variable that has the best combination of the highest steady state gain and the fastest response time to the manipulated variable. One of the control and auxiliary variables may be chosen as the most significant for this manipulated variable using a dialog box. In this embodiment, the control routine 400, which of course stores the previously selected control and auxiliary variables in a memory, may check to assure that the operator does not select the same control or manipulated variable as being associated with two different manipulated variables. If the user or operator selects a control or auxiliary variable that has already been selected for another manipulated variable, the routine 400 may present an error message to the user or operator informing the user or operator of the selection of a previously selected control or auxiliary variable. In this manner, the routine 400 prevents the selection of the same control or auxiliary variable for two or more different manipulated variables.

As will be understood, the operator may be enabled to select the subset of M control and auxiliary variables that will be used as inputs the MPC control algorithm which is especially useful when there are numerous ones of these variables. Of course, the set of control and constraint variables determined at the block 94 may be selected automatically or electronically based on some pre-established criteria or selection routine which may choose the input variables to use based on some combination of gain response and time delay as determined from the step responses for the controlled constrained variables and the manipulated variables.

In another embodiment, an automatic selection process may first determine a control matrix by selecting an input/output matrix based on the condition number of the matrix, e.g., by minimizing the condition number to some desired extent, and by then developing a controller configuration from the control matrix.

In this example, for a process gain matrix, A, the condition number of the matrix ATA may be determined to test the matrix controllability. A smaller condition number generally means better controllability while a higher condition number means less controllability and more control steps or moves during dynamic control operation. There are no strict criteria for defining an acceptable degree of controllability and, therefore, the condition number can be used as a relative comparison of various potential control matrices and as a test for ill conditioned matrices. As is known, a condition number for an ill conditioned matrix approaches infinity. Mathematically, ill conditioning occurs in the case of co-linear process variables—that is, due to co-linear rows or columns in the control matrix. Thus, a major factor that affects the condition number and controllability is cross-correlation between matrix rows and columns. Careful selection of the input-output variables in the control matrix can reduce conditioning problems. Practically, there should be a concern if the condition number of a control matrix is in the hundreds (e.g., 500) or higher. With such a matrix, controller manipulated variable moves are highly excessive.

As discussed above, the control matrix solves the dynamic control problem, while the LP optimizer solves the steady state optimization problem and the control matrix needs to be a square input-output matrix even though MPC controller block may have an unequal number of MVs (including AVs) and CVs. To begin selecting the inputs and output for the control matrix for use in generating the controller, all the available MVs are typically included or selected as controller outputs. After selecting the outputs (the MVs), the process output variables (i.e., the CVs and AVs) that are made part of the dynamic control matrix must be selected in such a manner to produce a square control matrix that is not ill conditioned.

One method of automatically or manually selecting the CVs and AVs as inputs within the control matrix will now be discussed, it being understood that other methods may be used as well.

Step 1—CVs are selected until, if possible, the number of CVs equals the number of MVs (i.e., the number of controller outputs). In the case in which there are more CVs than MVs, the CVs may be chosen in any order based on any desired criteria, such as the priority, gain or phase responses, user input, etc. If the total possible number of CVs is equal to the number of MVs then proceed to Step 4 to test the resulting square control matrix condition number for acceptability. If the number of CVs is less than the number of MVs, AVs may be selected as described in Step 2. If there are no CVs defined, select the AV with maximum gain relative to an MV and go to Step 2.

Step 2—Calculate one by one, the condition number for every possible AV added to already selected control matrix defined by the previously selected CVs and AVs. As will be understood, the matrix defined by the selected CVs will include a row for each selected CV and AV, defining the steady state gain for that CV or AV to each of the previously selected MVs.

Step 3—Select the AV determined in Step 2 that results in the minimum condition number for the resulting matrix and define the matrix as the previous matrix with the addition of the selected AV. If number of MVs now equals the number of selected CVs plus the number of selected AVs (that is, if the matrix is now square) go to Step 4. Otherwise return to Step 2.

Step 4—Calculate the condition number for the created square control matrix Ac. If desired, the condition number calculation for the matrix Ac instead of the matrix AcTAc may be used, as the condition numbers for these different matrices are related as the squared root of the other.

Step 5—If the condition number calculated at Step 4 is acceptable, associate every CV and selected AV with an MV, by selecting the CV or AV having the maximum gain relative to a specific MV until the pairing is complete. At this point the selection process is complete. If, on the other hand, the condition number is greater than the minimum acceptable condition number, remove the last AV/CV added to the control matrix and perform the wrap-around procedure of Step 6.

Step 6—Perform a wrap-around procedure for each of the selected MVs, one at a time and calculate the condition number of the matrix that results from each wrap-around procedure. Essentially, a wrap-around procedure is performed by placing, in turn, a unity response for each of the different MVs in place of removed AV (or CV). The unity response will be unity at one of the positions in the row of the matrix and zero everywhere else. In essence, each the particular MVs is being used as an input and an output in this case instead of the AV to form a well conditioned square control matrix. As an example, for a four by four matrix, the combinations 1000, 0100, 0010, and 0001 will be placed in the row of the removed AV line in the gain matrix, Ac.

Step 7—After performing a wrap around procedure for each of the MVs, select the combination that results in the minimum condition number. If there is no improvement, keep the original matrix). At this point, associate every selected CV and selected AV with an MV, by selecting the CV or AV with maximum gain relative to a specific MV, excluding the MV that is used for controlling itself (i.e., the MV that was wrapped-around).

Of course, the control matrix defined by this procedure as well as the resulting condition number may be submitted to the user and the user can accept or reject the defined control matrix for use in generating the controller.

It should be noted that, in the automatic procedure described above, at most only one MV was selected for controlling itself (i.e., wrapped-around) for the purpose of improving controllability. In the manual procedure the number of wrapped-around MVs can be arbitrary. The MVs selected for controlling themselves are evident by the absence of a corresponding output variable selection in the controller configuration. Also, one can use more MVs as wrap-arounds for control if the number of MVs is greater than the number of total CVs plus AVs. In this way, at the end, a square control matrix is still provided to the controller having each of the MVs as outputs. It will be understood that the process of performing and using wrap-arounds means that the number of CVs and AVs selected for the control matrix can be less than the number of MVs controlled by the controller, with the difference being the number of MVs wrap-around as inputs the control matrix. Further, this wrap-around procedure can be used in a process that has less CVs plus AVs than MVs.

Of course, the condition number is calculated above using the steady state gains and, therefore, the control matrix defines controllability essentially for steady state. Process dynamics (dead time, lag, etc.) and model uncertainty also have an effect on dynamic controllability and these effects can be taken into account by changing the priority of process variables (e.g., control and auxiliary variables), which may dictate their inclusion in the control matrix due to the effects they have on dynamic control.

It is also possible to use other heuristic procedures intended to improve both steady state and dynamic controllability. Such a procedure would typically have number of heuristic criteria, possibly some that are contradictory, that are applied in several phases to develop a control matrix and, thereby select an appropriate set of controller inputs, that provide some improvements of the control matrix. In one such heuristic procedure, the CVs and the AVs will be grouped by MV based on the highest gain relationship. Then, for each MV grouping, the one process output with fastest dynamics and significant gain will be selected. This selection process may consider confidence interval and give preference to CVs over AVs (with all else equal). The process model generation routine will then use the parameter selected from each group during the MPC control generation. Because only one parameter is selected for each MV, the response matrix is square and can be inverted.

In any event, after choosing the subset of M (or less) control and auxiliary variable inputs to the MPC controller, a block 614 of FIG. 4 generates the process model or controller to be used in the MPC control algorithm 530 of FIG. 3 from the determined square control matrix. As is known, this controller generation step is a computationally intensive procedure. A block 616 then downloads this MPC process model (inherently including the control matrix) or controller and, if need be, the step responses and the steady state step response gain matrix to the control block 380 and this data is incorporated into the control block 380 for operation. At this time, the control block 380 is ready for on-line operation within the process 500.

Referring now to FIG. 5, the general steps performed during each operation cycle or scan of the advanced control block 380, as created using the flow chart 600a of FIG. 4, while the process 500 is operating on line are illustrated. At a block 618, the MPC controller 520 (FIG. 3) receives and processes the measured values of the control and auxiliary variables CV and AV. In particular, the control prediction process model processes the CV, AV and DV measurements or inputs to produce the future control parameter vector, as well as the predicted steady state control and auxiliary variables CVSS and AVSS.

Next, at a block 620, the input processing/filter block 580 (FIG. 3) processes or filters the predicted control and auxiliary and manipulated variables CVSS, AVSS and MVSS developed by the MPC controller 520 and provides these filtered values to the optimizer 540. At a block 622, the optimizer 540 executes standard LP techniques to determine the set of M manipulated variable targets MVT which maximize or minimize the selected or default objective function while not violating any of the limits of the auxiliary and manipulated variables and while keeping the control variables at their specified set point or within the specified ranges for these variables. Generally speaking, the optimizer 540 will calculate a target manipulated variable solution MVT by forcing each of the control variables and the auxiliary variables to their limits. As noted above, in many cases, a solution will exist in which each of the control variables are at their set point (which may initially be treated as an upper limit on the control variable) while each of the auxiliary variables remain within their respective constraint limits. If this is the case, then the optimizer 540 need only output the determined manipulated variable targets MVT that produce an optimal result for the objective function.

In some cases, however, due to tight constraints on some or all of the auxiliary or manipulated variables, it may be impossible to find an operating point at which all of the control variables are at their set point and all of the auxiliary variables are within their respective constraint limits because such a solution does not exist. In these cases, as noted above, the optimizer 54 may allow the control variables to relax within their specified set point ranges in an attempt to find an operating point in which the auxiliary variables operate within their respective limits. If no solution exists in this case, then the optimizer may drop one of the auxiliary variable constraint limits as a limit within the solution and, instead, determine the optimal process operating point ignoring the dropped auxiliary variable constraint limits. Here, the optimizer chooses which auxiliary or control variable to drop as a constraint limit based on the respective weights provided for each of the control and auxiliary variables (with, for example, the lowest weight or highest priority being dropped first). The optimizer 540 continues to drop auxiliary or control variables based on their provided weights or priorities until it finds an target manipulated variable MVT solution in which all of the set point ranges for the control variables and the limits for the remaining, higher priority auxiliary variables are met.

Next, at a block 624, the target conversion block 550 (FIG. 3) uses the steady state step response gain matrix to determine the target values of the control and auxiliary variables CVT and AVT from the target values for the manipulated variables MVT and provides the selected N (where N is equal to or less than M) subset of these values to the MPC controller 520 as target inputs. At a block 626, the MPC controller 520 uses the control matrix or logic derived therefrom to operate as an unconstrained MPC controller as described above to determine the future CV and AV vector for these target values, performs vector subtraction with the future control parameter vector to produce the future error vector. The MPC algorithm operates in a known manner to determine steady state manipulated variable MVSS based on the process model developed from the M by M step responses and provides these MVSS values to the input processing/filter block 580 (FIG. 3). At a block 628, the MPC algorithm also determines the MV steps to be output to the process 500 and outputs the first of these steps to the process 500 in any appropriate manner.

In normal situations, the target set points are within acceptable ranges and the constraint variables are within limits. However, when disturbances are too severe to be compensated, the optimizer may not find a solution within limits. Because the basic function for on-line optimization is to have an optimal solution in all circumstances, an effective mechanism is utilized for handling infeasibilities when process variables are predicted to be out of their limits.

The extension of the objective function for such cases is based on a special use of parameters referred to as slack variables. In linear programming, slack variable vectors $S_{max} \geq 0$ and $S_{min} \geq 0$ are used to transform the inequalities:

$$CV_{min} \leq CV_{predicted} + \Delta CV(t+p) = CV_{predicted} + A^* \Delta MV(t+c) \leq CV_{max}$$

into the following equalities:

$$CV_{predicted} + A^* \Delta MV(t+c) = CV_{min} + S_{min}$$

$$CV_{predicted} + A^* \Delta MV(t+c) = CV_{max} - S_{max}$$

The equality is required for the linear programming model, thus slack variables serve only as formal parameters with no specific application meaning. However, adding slack variables serves to increment the degrees of freedom. Therefore, adding yet another slack variable for each equation will increase the degrees of freedom and will allow finding a solution in situations where the solution violates the limits. Slack variables may be applied to extend the range limits, with the slack vector $S^+ \geq 0$ for the high limit violation and the slack vector $S^- \geq 0$ for the low limit violation, as below:

$$CV_{predicted} + A^* \Delta MV(t+c) = CV_{min} + S_{min} - S^-$$

$$CV_{predicted} + A^* \Delta MV(t+c) = CV_{max} - S_{max} + S^+$$

Figure 6:
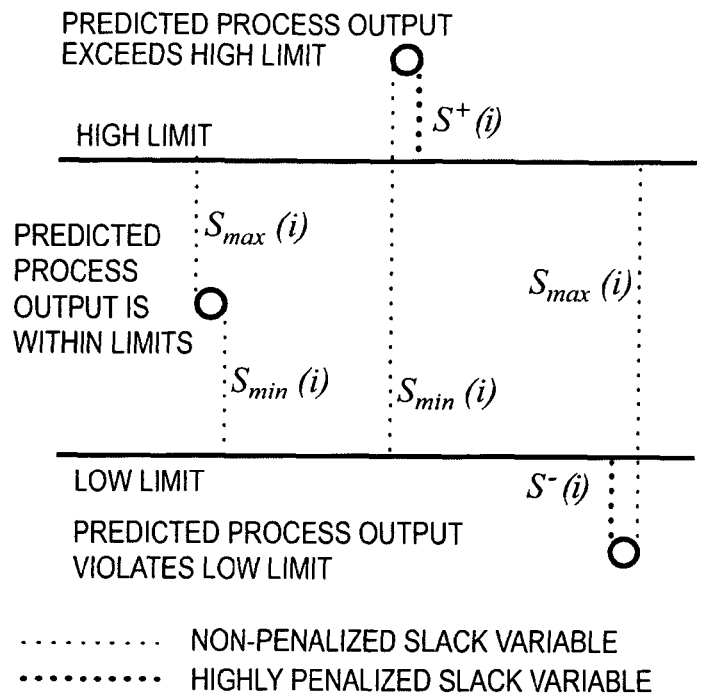
FIG. 6 is a diagram illustrating an application of slack variables for constraint handling.

FIG. 6 provides an example illustrating the concept of slack variables for constraint variables (process outputs with no set points). S(i) denotes the component i of the relevant slack vector. There will be a pair of equations, as shown immediately above, for each value of the CV prediction. Depending on the actual prediction value, some of the slack variables will be zero. It is noted that only the non-zero slack variables are shown in the FIGS. 6-9.

To find an LP solution that is within the process variable limits or minimally violates the limits, the new slack variables are penalized, such that these penalties are significantly higher than the terms that denote economic costs or profits. Therefore, the objective function:

$$\min Q = P^T * A * \Delta MV(t+c) + D^T * \Delta MV(t+c)$$

is extended by adding constraint penalizing terms $P_{C-}^T * S^-$ and $P_{C+}^T * S^+$ such that:

$$\min Q = P^T * A * \Delta MV(t+c) + D^T * \Delta MV(t+c) + P_{C-}^T * S^- + P_{C+}^T * S^+$$

where $P_{C-}^T$ is the penalty vector for violating low constraint limits, $P_{C+}^T$ is the penalty vector for violating high constraint limits, $P_{C-} \gg P$ and $P_{C+} \gg P$, and $P_{C-} \gg D$ and $P_{C+} \gg D$. Simplifying notations, it can be assumed $P_C \geq P_{C-}$ and $P_C \geq P_{C+}$.

All components of the vector $P_C$ are generally significantly larger than economic cost/profit vectors. It is reasonable to assume that the smallest component of the vector $P_C$ is greater than the largest component of the P vector.

The value of penalty on the slack variables maybe set automatically during the process of achieving the optimal solution. The penalty values depend on the variable priority and the economic values of the objective function, although it should be understood that additional considerations on the objective function with slack variables may be utilized.

By applying penalize slack variables, it is possible to set operational process behavior in the desired way. For example, it is easy to define expandable ranges for the controlled and constrained variables, flexible limits and set points for the opus and inputs, and other predefined conditions. A resulting advantage of the optimizer is that an optimal solution is guaranteed for any condition. In principle, the terms of the multi-objective functions related to the penalize slack variables set different goals of an previous economic weighted functions. As such, the complete function optimization set by this function is multi-objective and multi-goal, thereby expanding the area of linear programming applicability beyond originally defined tasks.

Figure 7:
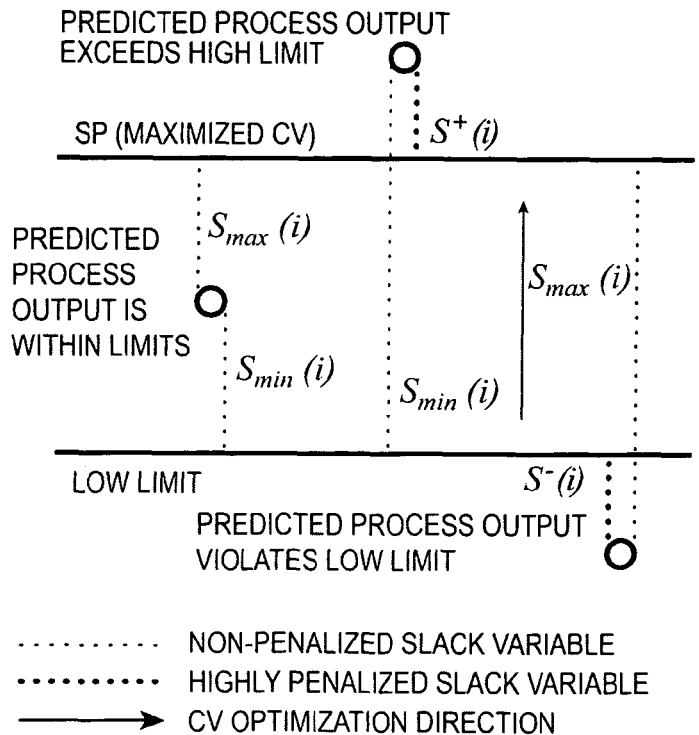
FIG. 7 is a diagram illustrating an application of slack variables to maximize single sided range control.
Figure 8:
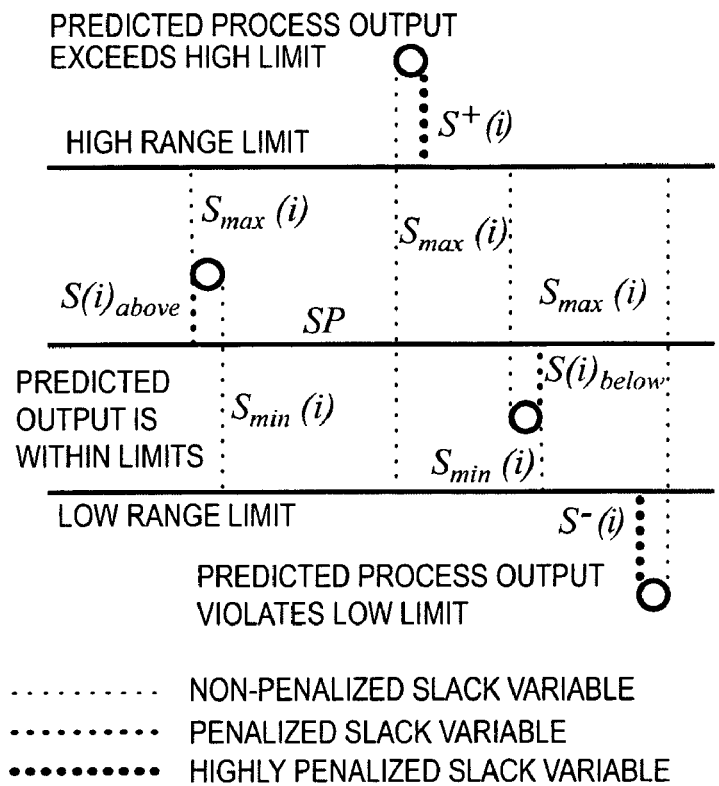
FIG. 8 is a diagram illustrating an application of slack variables to two-sided range control.

Generally, a range may be approximated around the set point of a controlled variable within which no further control action needs to be taken. Because slack variables lend themselves naturally to such a representation, an extension of the multi-objective optimizer is the use of slack variables to define acceptable ranges for set point optimization. The ranges are defined around the set point value, and are necessarily within the low/high set point limits. Set point ranges can be single sided or two sided. Single sided ranges are associated with minimization and maximization objective functions, as shown in FIG. 7. Two sided ranges have no economic objective other than realizing the optimal solution as close as possible to the set point within the defined ranges, as extended by the penalized slack variables, as shown in FIG. 8. A range equal to zero indicates a set point with highly penalized slack variables around it.

The equations for set point control with the two-sided ranges, for each CV prediction, are of the form:

$$CV_{predicted} + A*\Delta MV(t+c) = SP - S_{below} + S_{above}$$

$$CV_{predicted} + A*\Delta MV(t+c) = CV_{min} + S_{min} - S^-$$

$$CV_{predicted} + A*\Delta MV(t+c) = CV_{max} - S_{max} + S^+$$

where $S_{below}$ and $S_{above}$ are additional vectors of slack variables for the solutions below and above the set points. Therefore, an additional term:

$$P_{below}^T * S_{below} + P_{above}^T * S_{above}$$

is added to the objective function, where $P^T_{below}$ is the unit penalty for the solution below the set point, and $P^T_{above}$ is the unit penalty for the solution above the set point. It is reasonable to assume that:

$$P_{below}^T = P_{above}^T = P_S^T$$

Applying penalized slack variables in this manner, the optimizer can find a solution at its first execution, even if the solution is outside the output limits. This approach also allows the handling of process inputs in a more flexible way. Inputs (MVs) have only hard constraints. It is also possible to define soft constraints, contained within hard constraints, for some of the inputs. Introducing penalized slack variables for the soft constraints, it is easy to define a penalized range for the MVs. For this the following equations are provided:

$$MV_{min}^{soft} - S_{soft\,min}^- = MV_{current} + \Delta MV(t+c)$$

$$MV_{max}^{soft} + S_{soft\,max}^- = MV_{current} + \Delta MV(t+c)$$

Figure 9:
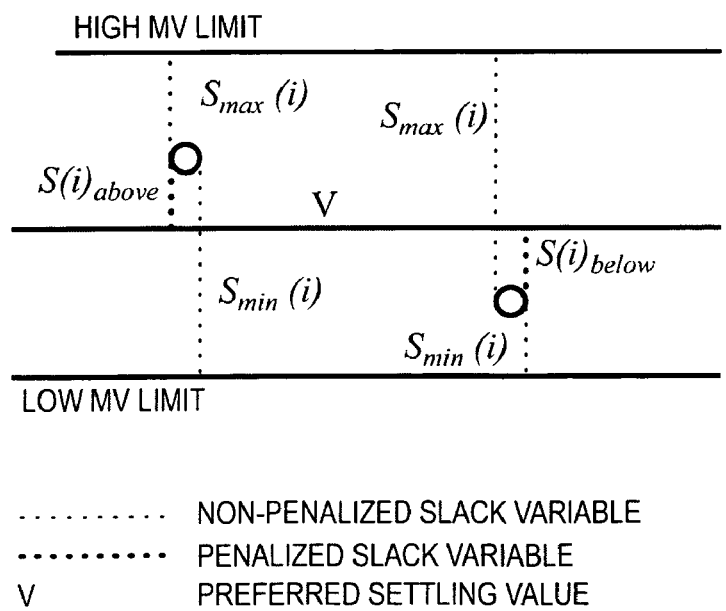
FIG. 9 is a diagram illustrating an application of penalized slack variables to account for the preferred settling value.

The same approach is used to define preferred settling value (PSV or V), the configured settling value of the MV. If there are no active conditions that require a change to the MV value, the MV will tend towards its PSV value. PSV is either set by the user or it may be the last value of the MV. The equations for an MV with PSV as shown in FIG. 9 are:

$$V - S_{below} + S_{above} = MV_{current} + \Delta MV(t+c)$$

$$MV_{min} + S_{min} = MV_{current} + \Delta MV(t+c)$$

$$MV_{max} - S_{max} = MV_{current} + \Delta MV(t+c)$$

PSV is the lowest priority control objective, to be achieved after the other objectives (e.g., economic, constraint and/or control) are satisfied. Objective function terms for the penalized MV slack vectors $S_{below}$, $S_{above}$ are set in a similar way as those for the CV set point slack vectors.

The three optimization objectives (economic, constraint and control), using the penalized slack variables $S_C^+$ and $S_C^-$ for constraint and $S_{SP}^+$, $S_{SP}^-$, $M^+$ and $M^-$ for control, can then be combined to result in the following general form of the multi-objective optimization function:

$$Q = (P^T*A + D^T)MV^n - (P^T*A + D^T)MV^{n-1} - P_C^T*S_C^+ - P_C^T S_C^- - P_S^T*S_{SP}^+ - P_S^T*S_{SP}^- - D_M^T*M^-$$

Figure 10:
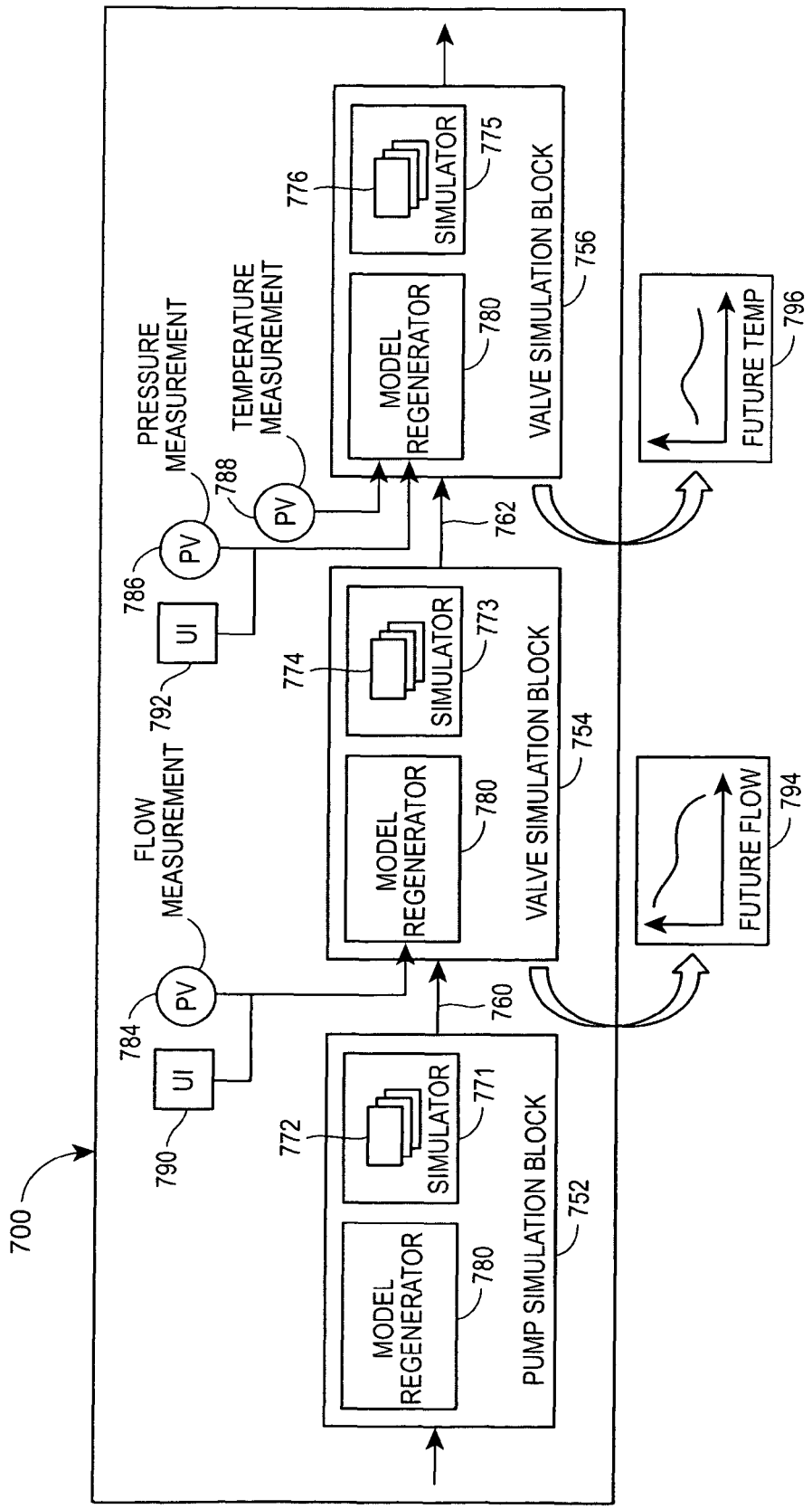
FIG. 10 is a simplified block diagram illustrating a simulation system having multiple simulation blocks which use process models to provide future predicted process values and which update the process models based on process measurements or user inputs.

Referring to FIG. 10, an example of a simulation system 750 is shown. Although the following describes an example of model predictive control and optimization, a more detailed example of model predictive control and optimization may be found in U.S. patent application Ser. No. 11/537,975 entitled "Updating and Utilizing Dynamic Process Simulation in an Operating Process Environment" filed on Oct. 2, 2006 (and specifically the description of FIG. 9 thereof which describes a simulation system having multiple simulation blocks), the entire contents of which are expressly incorporated by reference herein.

FIG. 10 illustrates a simulation system 750 for a part or a portion of a process plant, the simulation system 750 being made up of multiple simulation blocks 752, 754 and 756, and if desired, smart connection elements 760 and 762 connecting the simulation blocks, 752, 754 and 756. It will be understood that, in certain embodiments, the simulation system 750 may be executed in parallel to (e.g., at the same time as or in conjunction with) a process control routine running within the actual process plant, and that the simulation system 750 may be connected to components of the process plant (or to the control system of the process plant) in a manner described in more detail below to perform enhanced and more accurate simulation activities.

In particular, as illustrated in FIG. 10, a pump simulation block 752 includes a simulation routine 771 that implements or uses one or more process (e.g., equipment) models 772 to simulate the operation of a portion of a process plant, such as the operation of a piece of equipment within the process plant. In particular, the simulation routine 771 uses various inputs to the block 752, as provided by for example, other simulation blocks, a control system, a user, etc., to simulate or estimate the flow, pressure and/or other process variable(s) developed by or at the actual pump device within the process plant that is being simulated. These flow, pressure, and/or other simulated variables, along with other characteristics of the flow or the material being pumped, such as viscosity, material balance, etc. are provided to a connection object 760 which delivers these measurements to the valve simulation block 754. If desired, the connection object 760 may be a smart connection object that processes the simulated output variables developed by the block 752 based on the simulated operation of the connection structure within the process plant, to provide simulated flow, pressure, etc. elements to the valve simulation block 754. Of course, the connection object 760 need not be a smart connection object but could simply be a link between the pump simulation block 752 and the valve simulation block 754 for providing an indication of the pressure, flow or other simulated process variables developed and output by the pump simulation block 752, Likewise, the valve simulation block 754 includes a simulation routine 773 that includes and uses one or more process models 774 (which may include equipment models) to model the operation of a valve based on measurements or conditions associated with the valve (valve position, etc.) and the simulated inputs to the valve simulation block 754 provided by the connection object 760. Again, the simulation routine 773 may use the process models 774 to simulate the operation of an actual valve within the process plant in any known manner to thereby produce one or simulated output variables, such as a simulated flow from the valve, a simulated pressure at the output of the valve, a simulated temperature of fluid within or at the output of the valve, etc. Indications of these simulated process variables may be provided to the connector object 762 which may process these variables to provide inputs to the reactor simulation block 756. Of course, again, the connector object 762 may simply be a communication link that provides the output(s) of the valve simulation block 754 to the input of the reactor simulation block 756.

As shown in FIG. 10, the reactor simulation block 756 also includes a simulation routine 775 which uses one or more process models 776 to simulate the operation of a reactor within the process plant, based on reactor conditions and variables (equipment variables) and the inputs to the reactor simulator block 756 provided by the connector object 762.

The process models 776 are used to produce one or more simulated outputs of the reactor, which may include process fluid temperature, pressure, material balances, etc. Thus, as will be understood in this case, where the process simulation is implemented as one or more blocks that represent process equipment, then the outputs of these blocks represent the simulated process conditions that are calculated based on the inputs to the process simulation blocks.

The process models 772, 774 and 776 may be any desired types of process models, including parametric and non-parametric process models. For example, the process models 772, 774 and 776 may be first principle models, such as first-order plus dead time process models, process models reflecting a series of impulse or step response input/output curves based on actual measurements made during operation of the process, such as those typically used in model predictive control (MPC) techniques, neural network models, fuzzy logic models, process models of the type disclosed in U.S. Pat. No. 7,113,834 entitled "State Based Adaptive Feedback Feedforward PID Controller," which issued on Sep. 26, 2006 and U.S. Pat. No. 6,577,908 entitled "Adaptive Feedback/Feedforward PID Controller," which issued on Jun. 10, 2003, the entire disclosures of which are hereby incorporated by reference herein, or any other types of process models. Moreover, the models used in the simulation blocks 752, 754 and 756 may be created in any manner, such as by a user or a designer specifically for the purpose of simulation. However, in some cases, these models may be copied from a portion of an on-line control system which uses process models to perform control or optimization activities. For example, MPC controllers typically generate a process model for use by the controller during on-line control activities, and this process model may be imported to one or more relevant or related simulation blocks for use in performing simulation activities for the MPC controller or a portion of the plant controlled by the MPC controller.

While the configuration of a simulation system such as that of FIG. 10 is useful in providing off-line simulation activities, it has been determined that it is also possible to run the simulation system 750 in an on-line or parallel mode with respect to the process plant and, in doing so, to automatically or semi-automatically update the process models 772, 774 and 776 to account for changes in the actual process plant that may occur after creation of the simulation system 750, to thereby provide for a better or more accurate simulation system. In particular, by adding additional standard inputs to the simulation blocks of the simulation system 750, such as to the blocks 752, 754 and 756, wherein the standard inputs represent actual process measurements associated with the output parameters of the simulation blocks 752, 754 and 756 (e.g., corresponding to the block output parameters), it is possible, as part of the simulation algorithm, to automatically correct the process models 772, 774 and 776 used by the simulation blocks 752, 754 and 756 to compensate for the differences between the calculated (simulated) outputs and actual measurements of the simulated parameter as measured within the operating or on-line process.

Thus, as illustrated in FIG. 10, each of the simulation blocks 752, 754 and 756 includes a model regeneration block 780 which may be used to periodically update or regenerate the process models 772, 774 and 776 within the process simulation blocks 752, 754 and 756 based on feedback from the actual process and/or if desired, from a user. More particularly, the model regeneration blocks 780 may use a measurement indicative of an actual process variable (e.g., as measured within the process plant by, for example, the control system) and compare this measured process variable (PV) to the output of the simulation block corresponding to the measured process variable (for the same time as the measured process variable). The model regeneration block 780 may use this comparison to update or regenerate the process models used within the process simulation block in developing the simulated output. In accordance with this feature, a single PV flow measurement 782 is illustrated as being fed back from the process plant (e.g., by the control system used within the process plant) to the valve simulation block 754 to be used by the model regeneration block 780 within the valve simulation block 754. Here, the PV flow measurement 784 is or represents the measured flow output of the valve within the process plant that is being simulated by the valve simulation block 754. Likewise, a PV pressure measurement 786 and a PV temperature measurement 788 are illustrated in FIG. 10 as being fed back to the reactor simulation block 756 for use by the model regeneration block 780 of the reactor simulation block 756. In this case, the PV pressure measurement 786 and the PV temperature measurement 788 represent actual measurements of the pressure and temperature at the output of the reactor being simulated by the reactor simulation block 756. Of course, other types and numbers of PV measurements may be fed back to the simulation blocks 752, 754 and 756 with the nature and identity of these measurements typically being chosen based on the specifics of the process model or simulation being performed.

In any event, using these measured feedback signals from the process plant, the simulation blocks 752, 754 and 756 may change or be updated during ongoing operation of the process plant to more accurately reflect process operation. This updating may include calculating compensation or update factors to be applied to the outputs of these models. In this manner, the simulation system 750 adapts to the changing conditions within the process plant, to non-modeled changes, to non-linearities introduced into or associated with the plant, and to other changes in the plant, to provide for a more accurate simulation.

Besides performing better simulation, and thus producing more accurate simulated or predicted process variables, the adapted or regenerated process models 772, 774 and 776 developed by the simulation system 750 may be exported (periodically or when regenerated) to perform other activities within the process plant, such as control activities, user interface activities, optimization activities, etc. For example, if the models generated or updated within the simulation blocks 752, 754 and 756 are step or impulse response models, these models may be provided to an MPC controller to be used for MPC matrix and controller generation. An example of a combined MPC and optimizer system in which these updated models produced by the simulation system may be used for MPC controller generation, optimizer generation, etc. is disclosed in U.S. Pat. No. 7,050,863, referenced above. Thus, in this case, a simulation block may be created that utilizes a step response or a finite impulse response model to simulate a complex piece of equipment, process control loop or process response. For example, the DeltaV MPC-SIM block is designed to provide simulation in this manner. If such an approach is taken, then correction for on-line measurements similar to that performed in MPC control may be easily implemented to change or correct the process models 772, 774 and 776. Likewise, the process models 772, 774 and 776 may be other types of models such those described in U.S. Pat. Nos. 6,577,908 and 7,113,834 and may be re-used in an adaptive PID control technique described in these patents. As a result, the simulation blocks 772, 774 and 776 or parts thereof, may actually be provided back to the control system for use in control of the process plant. Moreover, if desired, different sets or combinations of process models from different simulation blocks may be combined and provided back to be used in on-line process operations, such as control and optimizer operations. Moreover, in one case, a process model may be developed for a control or optimizer or other routine used during on-line control activities, may be imported from the control system to the simulation system, may be updated in the simulation system as described above, and may then be provided back (in its updated or adapted state) to the control system for use by the controller or optimizer for which the non-adapted model was originally created.

While feedback of process measurements may be used to automatically regenerate the process models 772, 774 and 776 used in the simulation blocks 752, 754 and 756, a user may also provide manual feedback in some instances to regenerate the models 772, 774 and 776 used within the simulation blocks 752, 754 and 756. For example, in some cases, a process variable measurement may not be available for some reason, such as due to a faulty sensor, a communication problem, etc., or the measured process variable may be known to be faulty (e.g., suspect in accuracy) due to a mode condition associated with the measurement. In other cases, process variable measurements may be made off-line, such as in a laboratory, and therefore may not be available directly from the control system of the plant. In still other cases, a certain process variable or other variable used by one of the model regeneration blocks 780 may not actually be measured, but may be estimated or otherwise only provided by a user. In these cases, it is desirable to enable a user to provide an indication of the actual value of a simulated process variable to be used by the model regeneration blocks 780. This technique is illustrated in FIG. 10 by the UI blocks 790 and 792 which may be tied to or communicate with a user interface or other device that enables a user to specify a value of a process variable to be used as the "correct" or "measured" variable corresponding to the output of the simulation block (754 or 756), and thus to be used to perform model regeneration. In this manner, a user may cause the simulation blocks 752, 754 and 756 to regenerate the models used therein as well as to specify the values to be used to perform this regeneration. Of course, while only two UI blocks allowing user control of the feedback to the simulation blocks 754 and 756 are shown, it will be understood that any number of UI feedback paths or connections may be provided to any simulation block for any desired feedback variables, and that these UI connections may be provided in addition to or instead of connections to process variable measurements made by sensors or other elements within the control system.

Still further, where both a measured process variable and a user provided variable are provided to a simulation block, the simulation block may use one of these inputs as a primary input and the other input as a backup input to be used when the primary input fails, is unavailable or produces clearly incorrect results. Thus, for example, a simulation block may automatically or primarily use the measured PV signal fed back from the process control network to perform model regeneration. However, if the measured PV signal fails, is unavailable, is known to be faulty or produces clearly incorrect results, the model regeneration block 780 may use the input of the process variable provided by the user instead.

Moreover, it is possible, as part of the simulation algorithm used in any of the simulation blocks 752, 754 or 756, to calculate the future values of the output parameters of the block, instead of just the current values. Thus, as illustrated in FIG. 10, the valve simulation block 754 may provide a graph or a trend chart 794 of the simulated flow out of the valve being simulated over a specific future time period to a user at, for example, a user interface (not shown). This future flow characteristic may be developed by running the simulation system 750 over a period of time to estimate future values of output variables over a specific future time horizon. Likewise, as illustrated in FIG. 10, the reactor simulation block 756 may provide a plot or a trend chart 796 for the simulated output temperature based on the process models or other algorithms used therein. Of course, the computation of future process variable estimates may be computed using, for example, techniques similar to that used in MPC control to make future predictions. Some of these techniques are disclosed in more detail in U.S. Pat. No. 7,050,083. If desired, graphical elements or graphical interface elements may be provided by the simulation blocks 752, 754 and 756 to allow these future values to be accessed and viewed by other applications, by user interfaces within the process plant or by other interested devices.

Moreover, as will be understood, the future predicted values or future simulated values of one or more a process variables or other simulation outputs may be used to perform process model regeneration or updating within the simulation blocks of FIG. 10 in addition to, in conjunction with or instead of using a current predicted process variable value and a currently measured process variable value fed back to a simulation block. In this case, the future values calculated for a particular process variable or other process element may be computed and stored, and the actual value of the process variables may then be measured at the times corresponding to each of the computed future values. The difference(s) between the actual measured process element values at a particular time and the predicted future value at that particular time may then be used to regenerate the process model that is used in the simulation routine develop the future values. The use of future values to regenerate process models is especially applicable when the process models are step response models or impulse response models, such as finite impulse response models.

Thus, as described with respect to FIG. 10, actual process measurements may be used in simulation blocks to allow automatic correction of the process models used in the simulation block based on a comparison of a calculated value and a measured value for the same process element. Moreover, when process measurements are not available or have become unavailable, for example, due to a failure of measurement capabilities, then manual entry of the value may be used to correct the process model based on a comparison between the entered value and the calculated value. Still further, when the process simulation is based on a step or finite impulse response or other techniques, such as neural network, first principal models, or other commonly used techniques, the process models may be automatically corrected based on the difference between the calculated and measured value(s). More specifically, techniques that have previously been utilized in MPC may be used to correct the process model(s) including for example, bias correction in which a correction factor is calculated and applied to a process model (or to an output of a process model) based on the difference between the actual measured value and the simulated value of a process parameter to thereby eliminate a bias between the process model and the actual process plant. Of course other correction methods may be used as well, with a number of such correction techniques being described in U.S. Patent Application Publication No. 2004/0249483 A1, entitled "Multiple-Input/Multiple-Output Control Blocks with Non-Linear Predictive Capabilities," which published on Dec. 9, 2004 (and specifically the description with respect to FIG. 4 of this publication) and U.S. patent application Ser. No.

11/240,705, entitled "On-Line Adaptive Model Predictive Control in a Process Control System," which was filed on Sep. 30, 2005 (and specifically the description of FIGS. 2-4 thereof which describe a method of altering process models within an adaptive MPC control routine), the entire disclosures of which are hereby incorporated by reference herein.

Also, when the process simulation is based on a step or finite impulse response, or other techniques, such as neural network, first principal models, and other commonly used techniques, then the future output values can be calculated and saved for display. Again, for models based on step and finite impulse response, the techniques that have previously been utilized in MPC may be used to calculate the future values. Additionally, a process simulation environment may support viewing elements/applications that allow both the current and the future simulation output values to be displayed. For example, a user interface window may be provided to trend future output values using any desired viewing technique, such as trend graphs, bar graphs, numerical charts and graphs, etc.

If desired, the process modules described herein may provide and simulate redundancy functions within a process control network or a process plant. In particular, the process modules may simulate the operation of actual redundant elements, such as redundant devices, redundant control blocks, etc. disposed within the process plant and be able to detect or simulate the operation of actual redundant elements (including, for example, when the back-up redundant element should take over, etc.) Additionally, if desired, a process module with its simulation capabilities may be used as one of a redundant pair of elements within a process plant. In this case, the process module (or any portion thereof) may operate as a back-up device providing back-up or redundant data (signals, calculations, etc.) in case of a failure of or a detected problem associated with the primary (and actual physical) device. In this case, the process module acting as the redundant element may be communicatively interconnected with the control modules (that perform control or sensing operations) in any known manner to provide the redundant capabilities. This use of process modules as redundant elements within the process plant is particularly useful when the process modules are connected to one or more high fidelity simulation packages in the manner described above.

Figure 11:
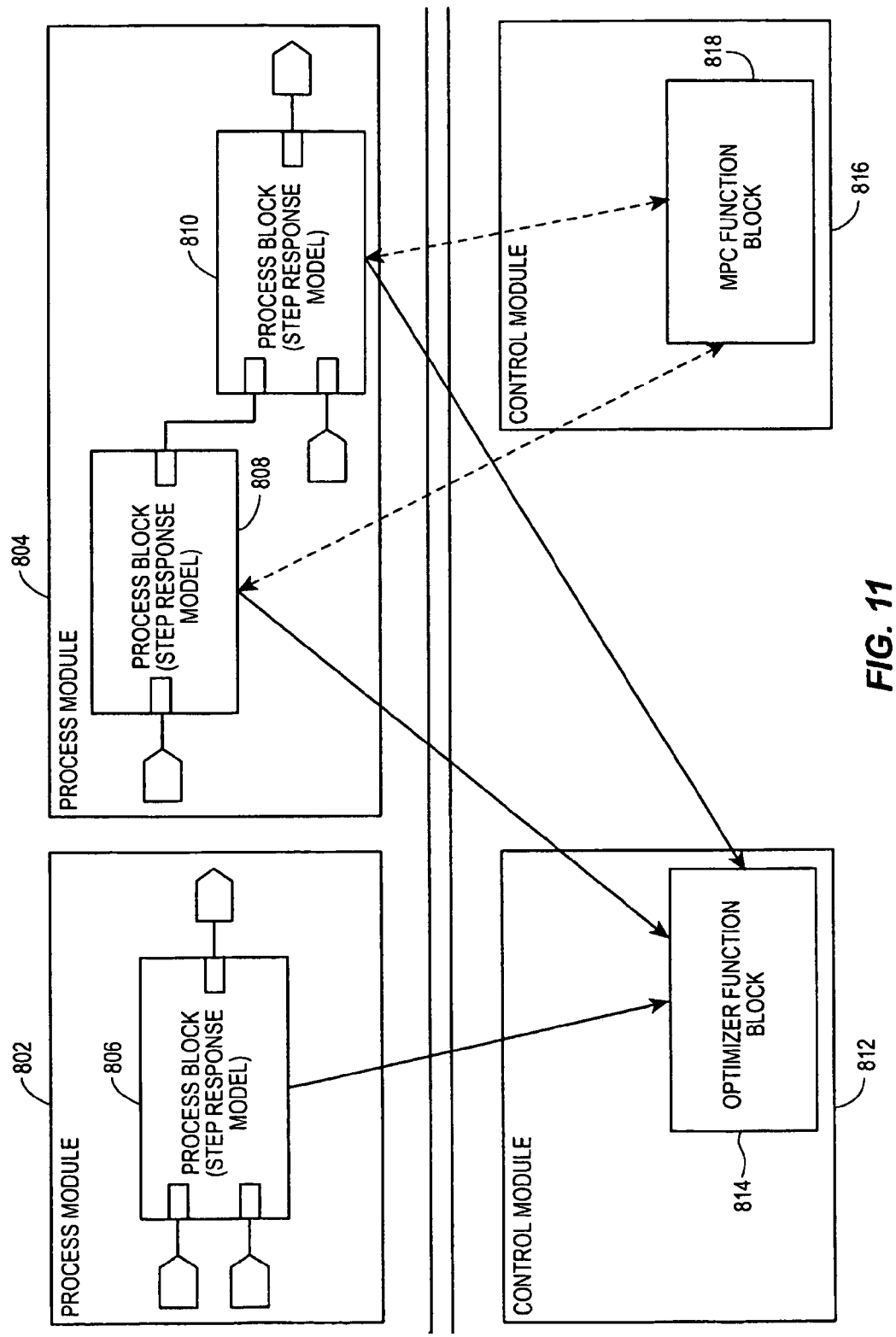
FIG. 11 is a block diagram illustrating the interaction between process simulation and the integrated optimizer and MPC controller.

FIG. 11 is a simplified block diagram illustrating an example of integration between model predictive control and process simulation. Referring to FIG. 11, the integrated model predictive control and optimization may be applied on the same process, with the model predictive control configuration being the subset of the online process optimizer. A result of this arrangement is the consistency of models used in the model predictive control, process simulation and optimization. In such cases the optimal targets are applied to the control variable inputs (CVs) included into the model predictive control configuration as control variable set points. The model process control optimizer develops control variable working set points. The scan rate of the online optimizer may be several times slower than the model predictive control scan rate. The online optimization configuration may contain both linear and nonlinear models, as well as using nonlinear optimization techniques.

As shown in FIG. 11, simulation blocks 806, 808, 810 (shown as step process models of process blocks) for each process module 802, 804 interact with the optimizer 812 and MPC 818 of control modules 812, 816. In particular, the multi-objective LP optimizer is integrated with the MPC controller and implemented as a control function block executing in the controller. Changes in the gain matrix and constant updates of predicted steady state values are provided from the simulation blocks, 806, 808, 810 to the optimizer function block 814. Model updates are provided upon demand between the process blocks and the MPC function block 818.

Three optimization objectives, constraint handling, economic optimization, and control functionality, have a well-defined setup in this implementation. The economic objective is satisfied prior to control objectives, unless limits are exceeded, in which case constraint handling takes the highest priority. The three different process variable types that the optimizer operates on are the control variables, the constraint variables and the manipulated variables. As indicated above, control variables are process outputs that need to be driven to their configured set point values. An acceptable range around the set point value may be defined for control variables. The constraint variables are process outputs that do not have set points, but should be maintained within configured high/low limits. The manipulated variables are process inputs that should be maintained within high/low limits, were the high/low limits are hard limits.

In addition, some of these process variables have associated economic value (cost/profit). As such, the optimizer 814 maintains the control variables at their set points while keeping all the variables within their limits, such that the final solution (target steady state values of the process variables) maximizes economic value. The optimization objectives for the different process variables of the MPC are set up according to constraint handling, economic optimization and control objectives.

Constraint handling is setup by assigning priorities to the process outputs (control and constraint variables) of the MPC configuration. Input limits (MV hard constraints) are included in the problem formulation and are inherently accounted in LP solution. The optimizer 814 operates such that if a constraint (or control) variable is predicted to exceed its limits (or its control range), the working target values of other constraint (or control) variables are adjusted to bring the process output within limits (or control range). In case processing conditions do not allow all the constraint and control variables to be maintained within their constraint limits and control ranges, the lower priority constraint or control variables are allowed to violate the limits or range in order to satisfy the higher priority constraints. The MPC function block 818 allows five priorities for the process outputs: high, higher than normal, normal, lower than normal, and low. Control variables may have 'normal' priority, while constraint variables may have 'higher than normal' priority. However, it should be understood that the priorities may be reviewed and adjusted, for example during configuration setup of the MPC. In addition, the priorities may be changed on-line in response to actual process conditions.

Economic optimization is configured by setting a value, for example in units of 'dollar value per percent' for some (or all) the control, constraint and manipulated variables included in the MPC block 818. An economic objective, with a defined value, may outweigh all related control-only objectives that have no economic value (value per percent is zero).

Control objectives define the multivariable control functionality at normal operating conditions, that is when all process outputs are within their control ranges and constraint limits, and economic optimum has been achieved. At that stage, the control functionality establishes the dynamic behavior of the remaining control, constraint and manipulated variables, including those not included in the objective function.

Figure 12:
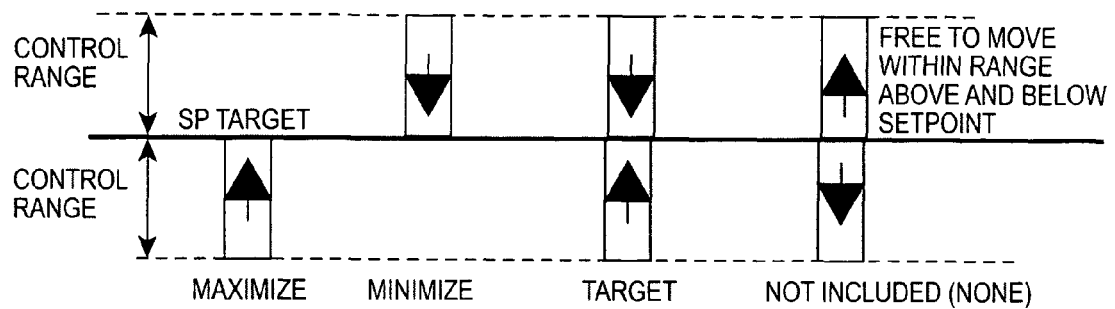
FIG. 12 is a diagram illustrating control parameter range and direction as driven by the optimizer.

Control variables have well defined behavior around set points and the corresponding control range. Control variables defined in the objective function are driven towards their set point values. However, a control variable may deviate from its set point, depending upon one of the following user defined optimization types, as shown in FIG. 12:

Maximize: the control variable moves below the set point within the control range, if necessary, to achieve constraint handling or economic objectives. When other objectives are achieved, it then moves towards the set point by maximizing the control variable.

Minimize: the control variable moves above the set point within the control range, if necessary, to achieve constraint handling or economic objectives. When other objectives are achieved, it then moves towards the set point by minimizing the control variable.

Target: the control variable moves above or below the set point within the control range, if necessary, to achieve constraint handling or economic objectives. When other objectives are achieved, it moves towards the set point.

None: the control variable not included in the objective function is maintained within the control range around the set point, with no attraction towards the set point.

Figure 13:
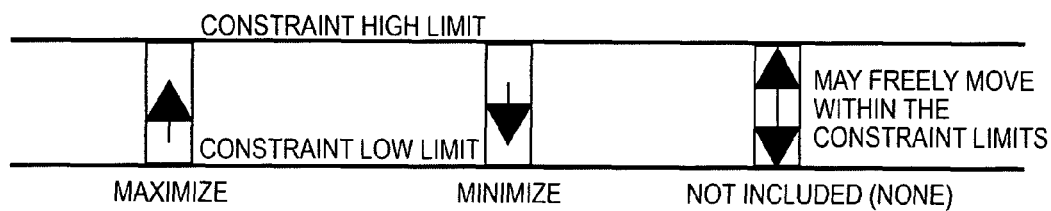
FIG. 13 is a diagram illustrating constraint parameter range and direction as driven by the optimizer.

Constraint variables included in the objective function may be driven towards their high (low) limit based on a maximize (minimize) definition. When a constraint variable is not included in the objective function (default: none), the optimizer makes changes that cause it to move freely within its upper and lower limits, as shown in FIG. 13.

Figure 14:
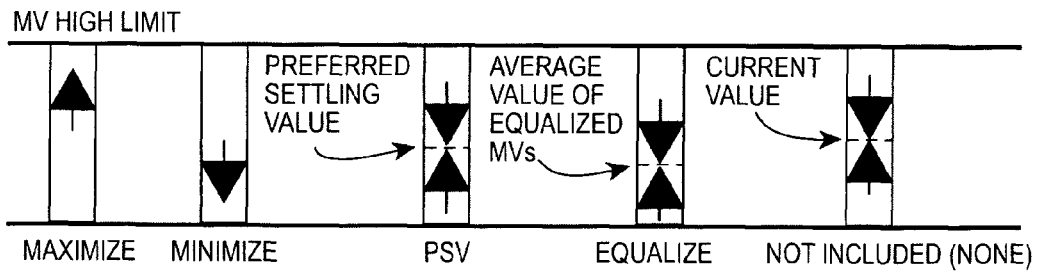
FIG. 14 is a diagram illustrating manipulated parameter range and direction as driven by the optimizer.

Manipulated variables included in the objective function may be driven towards their high (low) limit based on the associated maximize (minimize) setting. If a manipulated parameter is not included in the objective function (default: none), the optimizer attempts to maintain the current value if other conditions do not require the manipulated variable to be moved. In addition, the following MV optimization types are available, as shown in FIG. 14:

Preferred Settling Value (PSV): the manipulated variable moves towards the configured preferred settling value if active conditions do not require a change in MV value.

Equalize: two or more manipulated variables set to equalize are maintained at their average value, provided all other objectives are satisfied.

The optimization objective, at both the individual variable and the functional level, may be configured in an offline application. The default objective function is to maintain the control variables at their set points and maintain all variables within their limits. If the configuration contains only constraint variables, the last MV values are maintained, thereby preserving the stability of the configuration. The active objective function may be defined by including process variables and then setting their individual optimization type (such as maximize, minimize, target, PSV, equalize) and if required, their economic value.

There may be special requirements for multiple optimization objectives since the overall objective may change, such as maximize throughput, minimize energy, maximize quality, etc., in response to feedstock cost, product value, utilization or plant conditions. This lends itself to the concept of configuring multiple objective functions for the same MPC controller. During online operation of the MPC, the operator may switch between the various configured optimization objectives depending on current operating conditions.

In the simulation environment with the use of different modeling techniques (e.g., step response, first principle modeling, etc.), the process simulation satisfies various factors. For example, the process simulation may provide process output prediction up to the process steady state. The steady state gain matrix is defined directly from the step response model. Alternatively, the steady state gain matrix is calculated and updated from the first principle or parametric modeling and updated in real time. The process simulation may also define and update limits for process dependent variables and independent variables. All set points and ranges for the dependent variables are defined and updated. If different scans are applied for process units that are part of the optimized configuration, the scan rate for the optimization may be set as the scan for the slowest dependent variables (outputs). The target manipulated variable input (MV) and the target control variable input (CV) may apply filtering, with the filter time constant equal to at least a few simulation scans.

Accordingly, optimization may be provided as an extension of concurrent simulated systems. An effective way to apply an optimizer of any type, whether the optimizer be linear, nonlinear or linearized, is achieved by using the authorization predicted process outputs with prediction horizon up to the steady state. By applying model process control for the same process control and taking advantage of process optimization results in a configuration being a subset of the online optimizer configuration.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

While the multi-objective predictive process optimization and concurrent process simulation system and method, and other elements, may be implemented in software, they may also be implemented in hardware, firmware, etc., and may be implemented by any other processor. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium).

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A process control system for controlling a process, comprising:
 a process simulator adapted to simulate the process and produce a simulated output of the process, wherein the simulated output includes one or more predicted future values of the process;

an optimizer adapted to develop a set of target values based on measured inputs from the process and based on the simulated output from the process simulator; and a multiple-input/multiple-output controller adapted to produce, during each operational cycle of the process control system, multiple control outputs configured to control the process based on the set of target values provided to the multiple-input/multiple output controller from the optimizer during each operational cycle of the process control system.

2. The process control system of claim 1, wherein the process simulator is adapted to simulate the process concurrently with the operation of the process.

3. The process control system of claim 1, wherein the process simulator is adapted to simulate the process based on measured feedback outputs from the process, wherein simulation results are corrected by the measured feedback outputs to produce the simulated output of the process.

4. The process control system of claim 1, wherein the process simulator is adapted to simulate the process independent of the optimizer.

5. The process control system of claim 1, wherein the process simulator comprises a simulation model of the process and the optimizer comprises an optimization steady state model of the process based on the simulation model.

6. The process control system of claim 1, wherein the process simulator is adapted to simulate the process and produce a simulated output of the process up to a steady state of the process, and wherein the optimizer is adapted to develop the set of target values based on multiple measured inputs from the process and based on the simulated output of the process from the process simulator up to the steady state of the process.

7. The process control system of claim 1, wherein the process simulator comprises a step response model of the process.

8. The process control system of claim 7, wherein the process simulator is adapted to utilize a dynamic model matrix determined from the step response model to simulate the process and produce a simulated output of the process.

9. The process control system of claim 1, wherein the process simulator is adapted to utilize a dynamic model matrix determined from at least one of the group consisting of: first principles modeling and parametric modeling.

10. The process control system of claim 9, wherein the optimizer is adapted to develop a set of target values based upon a steady state gain matrix, wherein the steady state gain matrix is based upon the dynamic model matrix, and wherein the process simulator is adapted to update the dynamic model matrix in real time.

11. The process control system of claim 1, wherein the process simulator comprises one or more simulation blocks configured to simulate one or more portions of the process, each simulation block comprising:
a process model that models at least a portion of the process; and
a simulation unit that utilizes the process model to simulate the operation of the portion of the process to produce the simulated output for a process element associated with the portion of the process, the simulated output including or more predicted future values for the process element.

12. The process control system of claim 11, wherein at least one of the simulation blocks includes an input adapted to accept an actual value of the process element corresponding to the simulated output for the process element.

13. The process control system of claim 12, wherein the input is communicatively connected to accept a measurement of the process element made during on-line operation of the process.

14. The process control system of claim 1, wherein the optimizer is adapted to apply the target values to the multiple-input/multiple-output controller as target manipulated variables.

15. The process control system of claim 1, wherein the optimizer is adapted to apply the target values to the multiple-input/multiple-output controller as target control variables.

16. The process control system of claim 1, wherein the optimizer is adapted to develop the set of target values based on an objective function and based on flexible process limitations.

17. The process control system of claim 1, wherein the optimizer comprises an objective function, and the optimizer is adapted to minimize or maximize the objective function and is further adapted to extend the objective function by degrees of freedom beyond a predefined set point range of a control variable.

18. The process control system of claim 1, wherein the optimizer comprises an objective function and the optimizer is adapted to minimize or maximize the objective function while keeping a set of control variables within predefined control variable limits and a set of manipulated variables within a set of predefined manipulated variable limits and, if no solution exists, to enable at least one of the control variable limits to be violated.

19. The process control system of claim 18, wherein the control variables comprise predicted control variables determined from the simulated output of the process.

20. The process control system of claim 18, wherein the optimizer is adapted to utilize one or more slack variables in the objective function to extend the set of control variables beyond the control variable limits, and further adapted to develop the set of target values based on a solution determined outside the predefined control variable limits.

21. The process control system of claim 20, wherein the optimizer is adapted to incrementally include slack variables into the objective function, wherein each additional slack variable extends the objective function by a further degree of freedom beyond the predefined set point limits.

22. The process control system of claim 21, wherein the optimizer is adapted to apply a penalty to each additional slack variable included in the objective function, wherein the penalty for each slack variable is dependent on a priority associated with the control variable.

23. The process control system of claim 1, wherein the optimizer comprises a linear programming optimizer.

24. The process control system of claim 1, wherein the optimizer comprises a nonlinear programming optimizer.

25. The process control system of claim 1, wherein the multiple-input/multiple-output controller comprises a model predictive controller.

26. A method of optimizing a process having a plurality of manipulated variables and a plurality of control variables capable of being effected by changes in the manipulated variables, the method comprising:
simulating the operation of the process using a process model of the process to produce a simulated output of the process, wherein the simulated output includes one or more predicted future values of the process;
providing the predicted future values of the process to an optimization model of the portion of the process;
measuring inputs from the process;

performing process optimization using an optimization model by selecting a process operating point based on the measured inputs from the process and based on the simulated output from the process simulator, wherein the process operating point is defined by a set of target values for one or more of the plurality of control variables; and using the set of target values to control the process.

27. The method of claim 26, wherein simulating the operation of the process comprises simulating the operation of the process concurrently with the operation of the process.

28. The method of claim 26, wherein simulating the operation of the process comprises:

measuring feedback outputs from the process, and correcting simulation results based on the measured feedback outputs from the process.

29. The method of claim 26, wherein performing process optimization comprises performing process optimization independent of simulating the operation of the process.

30. The method of claim 26, wherein simulating the operation of the process comprises simulating the operation of the process at a steady state of the process to produce a simulated output of the steady state of the process.

31. The method of claim 26, wherein performing process optimization comprises minimizing or maximizing an objective function with flexible process limitations.

32. The method of claim 31, wherein minimizing or maximizing an objective function with flexible process limitations comprises extending the objective function by degrees of freedom beyond a predefined set point range of a control variable.

33. The method of claim 31, wherein minimizing or maximizing an objective function with flexible process limitations comprises:

maintaining the one or more control variables within predefined control variable limits;

maintaining one or more of the manipulated variables within a set of predefined manipulated variable limits;

violating at least one of the control variable limits if no solution exists within the predefined limits; and selecting the process operating point based on a solution determined outside of the predefined limits.

34. The method of claim 33, wherein violating at least one of the control variable limits comprises applying one or more slack variables to the objective function, wherein each slack variable extends the one or more control variables beyond the predefined set point limits.

35. The method of claim 34, further comprising applying a penalty to each slack variable included in the objective function.

36. The method of claim 26, wherein simulating the operation of the process using a process model of the process to produce a simulated output of the process, comprising predicting the one or more control variables.

37. A process control element adapted to be used as a portion of a process control routine implemented on a processor to control a plurality of control parameters of a process using a plurality of manipulated parameters, the process control element comprising:

a computer readable medium;

a simulation function block stored on the computer readable medium and adapted to be executed on the processor to implement simulation of the process, the simulation function block comprising a simulation routine that simulates the process and produces a simulated output of the process including one or more predicted future values of the process;

a optimization function block stored on the computer readable medium and adapted to be executed on the processor to implement multiple input/multiple output control of the process during, the optimization function block including:

an objective function that defines an optimization criteria based on the plurality of control parameters;

an optimizer routine that uses the objective function and the simulated output from the simulation routine to produce a set of optimal target values for the control parameters during each control scan period;

a multiple-input/multiple-output control routine that produces a control signal for each of the plurality of manipulated parameters during each control scan period using the target values.

38. The process control element of claim 37, wherein the simulation routine simulates the process concurrently with the operation of the process.

39. The process control element of claim 37, wherein the simulation routine utilizes measured feedback outputs from the process to correct the simulation of the process to produce the simulated output of the process.

40. The process control element of claim 37, wherein the optimization function block comprises a steady state model of the process.

41. The process control element of claim 40, wherein the simulation function block comprises a simulation model of the process, and wherein the steady state model of the process is based on the simulation model of the process.

42. The process control element of claim 37, wherein the simulation routine simulates the process and produces a simulated output of the process to a steady state of the process, and wherein the optimizer routine uses the objective function and the simulated steady state output of the process to produce the set of optimal target values for the control parameters.

43. The process control element of claim 37, wherein the simulation function block comprises a model of the process and wherein the simulation routine utilizes a dynamic model matrix determined from the model.

44. The process control element of claim 43, wherein the model comprises at least one of the group consisting of: a step response model of the process, a first principle model of the process and a parametric model of the process.

45. The process control element of claim 43, wherein optimization function block comprises a steady state gain matrix based upon the dynamic model matrix, wherein the optimizer routine uses the steady state gain matrix to produce the set of optimal target values, and wherein the simulation routine updates the dynamic model matrix in real time.

46. The process control element of claim 37, wherein an optimizer routine applies the target values to the multiple-input/multiple-output control routine as target manipulated variables.

47. The process control element of claim 37, wherein an optimizer routine applies the target values to the multiple-input/multiple-output control routine as target control variables.

48. The process control element of claim 37, wherein the objective function comprises at least one slack variable and predefined control variable limits, and wherein the optimizer routine minimizes or maximizes the objective function while keeping the control variables within the predefined control variable limits, and, if an optimal solution does not exist within the predefined control variable limits, the optimizer routine violates the predefined control variable limits based on the at least one slack variable to produce the set of optimal target values for the control parameters.

49. The process control element of claim 48, wherein each slack variable comprises a degree of freedom beyond the control variable limits.

50. The process control element of claim 48, wherein the optimizer routine incrementally applies each slack variable to the objective function if an optimal solution does not exist within the predefined control variable limits and within any previously applied slack variables.

51. The process control element of claim 50, wherein the optimizer routine applies a penalty to each incrementally-applied slack variable.

52. The process control element of claim 37, wherein the optimizer routine comprises at least one of the group consisting of: a linear optimizer routine and a nonlinear optimization routine.

* * * * *

UNITED STATES PATENT AND TRADEMARK OFFICE
CERTIFICATE OF CORRECTION

PATENT NO. : 8,055,358 B2  
APPLICATION NO. : 11/567107  
DATED : November 8, 2011  
INVENTOR(S) : Terrence L. Blevins et al.

Page 1 of 1

It is certified that error appears in the above-identified patent and that said Letters Patent is hereby corrected as shown below:

In the Specification:

At Column 10, line 64, "a input" should be -- an input --.

At Column 12, line 40, "have" should be -- has --.

At Column 15, line 41, "can not" should be -- cannot --.

At Column 17, line 16, "can not" should be -- cannot --.

At Column 17, line 48, "can not" should be -- cannot --.

At Column 21, line 41, "6,445,6063" should be -- 6,445,963 --.

At Column 25, line 21, "each the particular MVs" should be -- each of the particular MVs --.

At Column 27, line 14, "finds an" should be -- finds a --.

At Column 28, line 46 "opus" should be -- outputs --.

At Column 28, line 50, "an previous economic weighted functions" should be -- a previous economic weighting function --.

Signed and Sealed this  
Ninth Day of July, 2013

Teresa Stanek Rea  
*Acting Director of the United States Patent and Trademark Office*